(12) United States Patent
Conrad et al.

(10) Patent No.: US 10,670,495 B2
(45) Date of Patent: *Jun. 2, 2020

(54) SYSTEMS AND METHODS FOR DETERMINING THE QUALITY OF A REPRODUCED (MANUFACTURED) OPTIC DEVICE

(71) Applicant: Brien Holden Vision Institute Limited, Sydney, NSW (AU)

(72) Inventors: Fabian Conrad, Maroubra (AU); Ravi Chandra Bakaraju, Kingsford (AU); Klaus Ehrmann, Queenscliff (AU)

(73) Assignee: Brien Holden Vision Institute Limited, Sydney, New South Wales (AU)

(*) Notice: Subject to any disclaimer, the term of this patent is extended or adjusted under 35 U.S.C. 154(b) by 0 days.

This patent is subject to a terminal disclaimer.

(21) Appl. No.: 16/430,060

(22) Filed: Jun. 3, 2019

(65) Prior Publication Data
US 2019/0391039 A1 Dec. 26, 2019

Related U.S. Application Data

(63) Continuation of application No. 15/526,205, filed as application No. PCT/AU2015/050700 on Nov. 11, 2015, now Pat. No. 10,352,816.
(Continued)

(51) Int. Cl.
*G01B 9/00* (2006.01)
*G01M 11/02* (2006.01)
(Continued)

(52) U.S. Cl.
CPC .... *G01M 11/0228* (2013.01); *G01M 11/0242* (2013.01); *G02B 27/4211* (2013.01); *G02C 7/00* (2013.01)

(58) Field of Classification Search
CPC .......... G02C 7/06; G02C 7/044; G02C 7/041; G02C 7/063; A61F 2/145; A61F 2/1618;
(Continued)

(56) References Cited

U.S. PATENT DOCUMENTS 5,581,347 A 12/1996 Le Saux et al.
6,750,958 B1 6/2004 Fantone et al.
(Continued)

FOREIGN PATENT DOCUMENTS

WO WO 2014/076155 5/2014
WO WO 2014/080207 5/2014

OTHER PUBLICATIONS

Sotiris Plainis et al., "Power Profiles of Multifocal Contact Lenses and Their Interpretation", Optometry and Vision Science, Oct. 1, 2013, pp. 1066-1077.
(Continued)

*Primary Examiner* — Hoa Q Pham
(74) *Attorney, Agent, or Firm* — Jones Day

(57) ABSTRACT

A method for assessing the similarity between a power profile of a manufactured optic device and a nominal power profile upon which the power profile of the manufactured optic device is based. The method comprises measuring the power profile of manufactured optic device, identifying a region of interest from the measured power profile of manufactured optic device, and applying an offset to the measured power profile to substantially minimize a statistical quantifier for quantifying the similarity between the nominal power profile and the offset measured power profile. The method further comprises comparing the offset and the statistical quantifier to predefined quality control metrics, determining whether the measured power profile meets the predefined quality control metrics based, at least in part on the comparison. In exemplary embodiments, the method
(Continued)

may further comprise determining whether to associate the manufactured optic device with another nominal power profile, if the measured power profile does not meet the predefined quality control metrics.

17 Claims, 32 Drawing Sheets

Related U.S. Application Data

(60) Provisional application No. 62/078,310, filed on Nov. 11, 2014.

(51) Int. Cl.
*G02B 27/42* (2006.01)
*G02C 7/00* (2006.01)

(58) Field of Classification Search
CPC ......... A61F 2/1451; A61F 2/16; G01M 11/02; G01M 11/0221; G01M 11/0242; G01M 11/0235
USPC ................ 356/124–127; 351/159.02–159.38, 351/159.73, 159.78, 159.79
See application file for complete search history.

(56) References Cited

U.S. PATENT DOCUMENTS

| | | |
|---|---|---|
| 7,416,300 B2 | 8/2008 | Wei |
| 9,195,074 B2 | 11/2015 | Bakaraju |
| 9,201,250 B2 | 12/2015 | Bakaraju |
| 9,759,930 B2 | 9/2017 | Bakaraju |
| 10,352,816 B2 * | 7/2019 | Conrad .............. G01M 11/0242 |
| 2005/0179863 A1 | 8/2005 | Taguchi et al. |
| 2010/0195093 A1 | 8/2010 | Ho |
| 2010/0250171 A1 | 9/2010 | Kozu |
| 2013/0278888 A1 | 10/2013 | Bakaraju |
| 2015/0292979 A1 | 10/2015 | Rayer |
| 2017/0115508 A1 | 4/2017 | Bakaraju |
| 2017/0176772 A1 | 6/2017 | Bakaraju |

OTHER PUBLICATIONS

Fang, et al., "Manufacturing and Measurement of Freeform Optics", CIRP Annals, vol. 62, No. 2, Dec. 13, 2013, pp. 823-846.
International Search Report dated Dec. 10, 2015 for PCT/AU2015/050700.

* cited by examiner

SYSTEMS AND METHODS FOR DETERMINING THE QUALITY OF A REPRODUCED (MANUFACTURED) OPTIC DEVICE

CROSS-REFERENCE TO RELATED APPLICATIONS

This application is a continuation of U.S. application Ser. No. 15/526,205, filed May 11, 2017, which is the National Phase application of International Application No. PCT/AU2015/050700, filed Nov. 11, 2015, which designates the United States and was published in English, which claims priority to U.S. Provisional Application No. 62/078,310, filed on Nov. 11, 2014. Each of these applications are herein incorporated by reference in their entirety.

This application is also related to U.S. application Ser. No. 14/046,356, filed on Oct. 4, 2013; U.S. application Ser. No. 13/857,613, filed on Apr. 5, 2013; International Application No. PCT/AU2013/000354, filed on Apr. 5, 2013; Australian Application No. 2013202664, filed on Apr. 5, 2013; and Australian Application No. 2012904541, filed on Oct. 17, 2012. Each of these applications are herein incorporated by reference in their entirety.

FIELD OF THE DISCLOSURE

This disclosure is related to systems and methods for determining the quality of a power profile and/or a surface profile on a manufactured optical device. In addition, this disclosure is also related to determining the quality of a complex power profile and/or complex surface profile on a manufactured optical device by using parametric descriptors of the manufactured optical device to analyze and compare the power profile and/or surface profile of the manufactured optical device with a nominal power profile and/or nominal surface profile.

BACKGROUND

Conventionally, power profiles for manufactured optic devices (e.g., contact lenses) have been relatively simple. For example, the power profiles may have been spherical or linear functions. In such a situation, manufacturing techniques were able to replicate the desired (nominal) power profile in a manufactured device. Since the power profiles were relatively simple, it was sometimes not necessary to test the manufactured device to determine whether the devices power profile was sufficiently close to the nominal power profile.

If testing was necessary, it was generally quite simple to determine if the manufactured optic device was sufficiently close to the nominal power profile. For example, the testing may have included verification of the optical power using a focimeter.

However, power profiles are becoming increasingly more complex. For example, the more complex power profiles may include increased variation, multiple peaks, multiple (e.g., primary, secondary, and tertiary) modes of spherical aberration. Manufacturing optic devices with these more complex features may be more complicated which makes testing the devices more relevant. However, the simple testing procedures used for optic devices with more simple power profiles may not be acceptable for optic devices with more complex power profiles. Typical testing procedures for relatively simple optic devices comprises selecting a few of the optic devices and testing them off-line to ensure the batch of products were acceptable. These procedures may have also included sampling optic devices during a particular manufacturing run and test the sampled products off-line to ensure the quality of the device was not drifting. These procedures may not be acceptable for more complex power profiles. In addition, the high speed manufacturing lines typically used to manufacture optic devices make it more difficult to test the optic devices in real time.

Accordingly, it is desirable to have systems and methods capable of determining the quality of these manufactured optic devices with more complex power profiles. In exemplary embodiments, it may be desirable to make the quality determinations in substantially real time and/or on a high speed manufacturing line. The present disclosure is directed to overcome and/or ameliorate at least one or more of the disadvantages of the prior art, as will become apparent from the discussion herein. The present disclosure also provides other advantages and/or improvements as discussed herein.

SUMMARY

Exemplary embodiments may provide a method for assessing the similarity between a power profile and/or a surface profile of a manufactured optic device, mold, and/or cavity and a corresponding nominal power profile and/or a nominal surface profile upon which the power profile and/or the surface profile of manufactured optic device, mold, and/or cavity is based, the method comprising: measuring the power profile and/or surface profile of manufactured optic device, mold, and/or cavity; identifying one or more regions of interest from the measured power profile and/or the measured surface profile of manufactured optic device, mold, and/or cavity; determining at least one offset to the measured power profile and/or the measured surface profile to substantially minimize a statistical quantifier for quantifying the similarity between the nominal power profile and/or the nominal surface profile and the offset measured power profile and/or offset measured surface profile; comparing the offset and the statistical quantifier to predefined quality control metrics; determining whether the measured power profile and/or the measured surface profile meets the predefined quality control metrics based, at least in part on the comparison.

In exemplary embodiments, the method may further comprise determining whether to associate the manufactured optic device, mold, and/or cavity with another nominal power profile, power, and/or another nominal surface profile, if the measured power profile and/or measured surface profile does not meet the predefined quality control metrics.

In exemplary embodiments, the method may further comprise applying a scaling factor to the offset measured power profile and/or offset measured surface profile to substantially minimize a statistical quantifier for quantifying the similarity between the nominal power profile and/or nominal surface profile and the scaled and offset measured power profile and/or scaled and offset measured surface profile and comparing the scale factor, offset and the statistical quantifier to predefined quality control metrics.

In exemplary embodiments, the method may further comprise applying an asphericity (or slope correction) to the scaled and offset measured power profile and/or scaled and offset measured surface profile to substantially minimize a statistical quantifier for quantifying the similarity between the nominal power profile and/or nominal surface profile and the scaled and offset measured power profile and/or scaled and offset measured power profile and comparing the rotation, scale factor, offset and the statistical quantifier to predefined quality control metrics.

In exemplary embodiments, the statistical quantifier may be a sum of the squared differences calculated over the region of interest. In exemplary embodiments, the statistical quantifier may be the sum of absolute differences divided by the total number of points defining the region of interest that provides the average sum of absolute differences. In exemplary embodiments, the statistical quantifier may be the area under curve obtained by subtracting the measured power profile from the nominal power profile.

In exemplary embodiments, the method may be performed during the manufacturing process of the manufactured optic device, mold, and/or cavity.

In exemplary embodiments, the method may be performed in substantially real-time.

In exemplary embodiments, the manufactured optic device, mold, and/or cavity may be manufactured on a high speed manufacturing line (e.g., a manufacturing line capable of producing 15, 20, 25, 30, 40, 45, 50, 55, 60, 65, 70, 75, 80, 85, 90, 95, or 100 optic devices per minute).

In exemplary embodiments, the nominal power profile and/or nominal surface profile may have a significant amount of variation.

In exemplary embodiments, the nominal power profiles and/or nominal surface profiles may comprise stepped profiles, square profiles, and/or triangular profiles.

In exemplary embodiments, the nominal power profile and/or nominal surface profiles may have multiple peaks and/or troughs along the half chord.

In exemplary embodiments, the nominal power profile and/or nominal surface profiles may have at least 2, 3, 4, 5, 6, 7, 8, 9, or 10 peaks and/or troughs along the half chord.

In exemplary embodiments, the nominal power profile and/or nominal surface profiles may have at least two spherical aberration terms.

In exemplary embodiments, the nominal power profile and/or nominal surface profiles may have at least two spherical aberration terms and a defocus term.

In exemplary embodiments, the nominal power profile and/or nominal surface profiles may have at least three spherical aberration terms.

In exemplary embodiments, the nominal power profile and/or nominal surface profiles may have at least 4, 5, 6, 7, or 8 spherical aberration terms.

In exemplary embodiments, the nominal power profile and/or nominal surface profiles may be non-monotonic.

Other aspects, features, and advantages will become apparent from the following description when taken in conjunction with the accompanying drawings, which are a part of the disclosure and which illustrate, by way of example, principles of the embodiments disclosed herein.

DESCRIPTION OF THE DRAWINGS

Notwithstanding other forms which may fall within the scope of the disclosure as set forth herein, specific embodiments will now be described by way of example and with reference to the accompanying drawings in which.

DETAILED DESCRIPTION

Manufactured optic devices such as contact lenses may include a power profile and/or a surface profile that describes the corrective power of the device at varying locations. In general, the power profile and/or surface profile is designed/selected and optic devices (e.g., contact lenses, intra-ocular lenses) are manufactured to include the desired (nominal) power profile and/or complex surface profile. In certain situations, the manufacturing process may include the generation of molds/cavities which are then used in the manufacturing of the optic devices with the desired (nominal) power profile and/or surface profile. As would be readily understood by persons of ordinary skill in the art, the power profile and/or surface profile of the manufactured optic device is unlikely to be identical to the nominal power profile and/or nominal surface profile. This may be due to a variety of factors involved with the manufacturing process. For example, in some instances the manufacturing equipment may not be precise enough and/or the power profile and/or surface profile may be more complex than the equipment is able to handle on a consistent and/or reliable basis.

The description herein generally discusses power profiles of manufactured optic devices, it should be generally understood by persons or ordinary skill in the art that equivalent and/or substantially equivalent methods and systems can also be applied to determine the quality of surface profiles of manufactured optical devices.

Figure 7A:
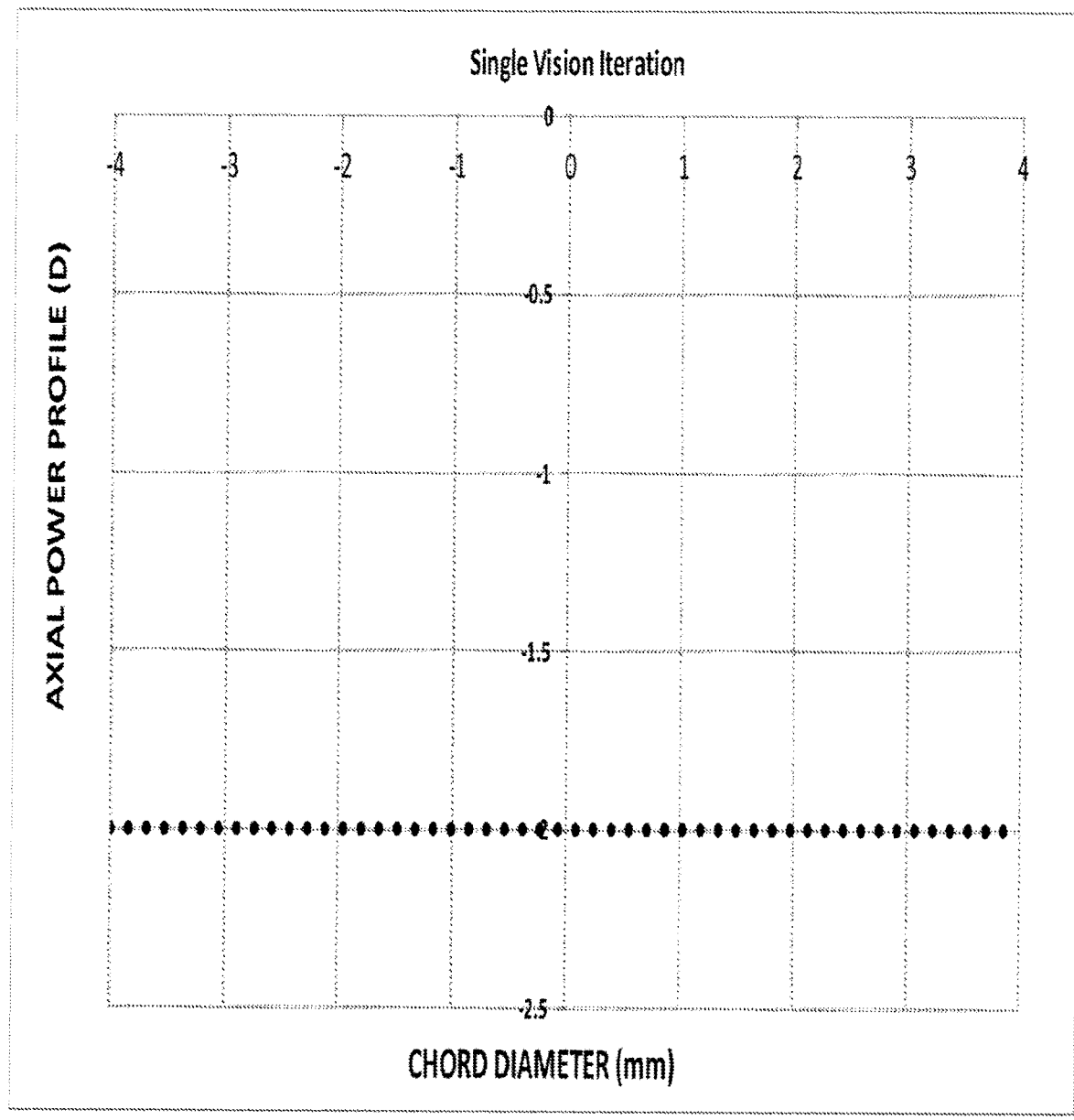
FIGS. 7A-7C are exemplary power profiles which are typically considered to be simple power profiles as the term is used herein.
Figure 7B:
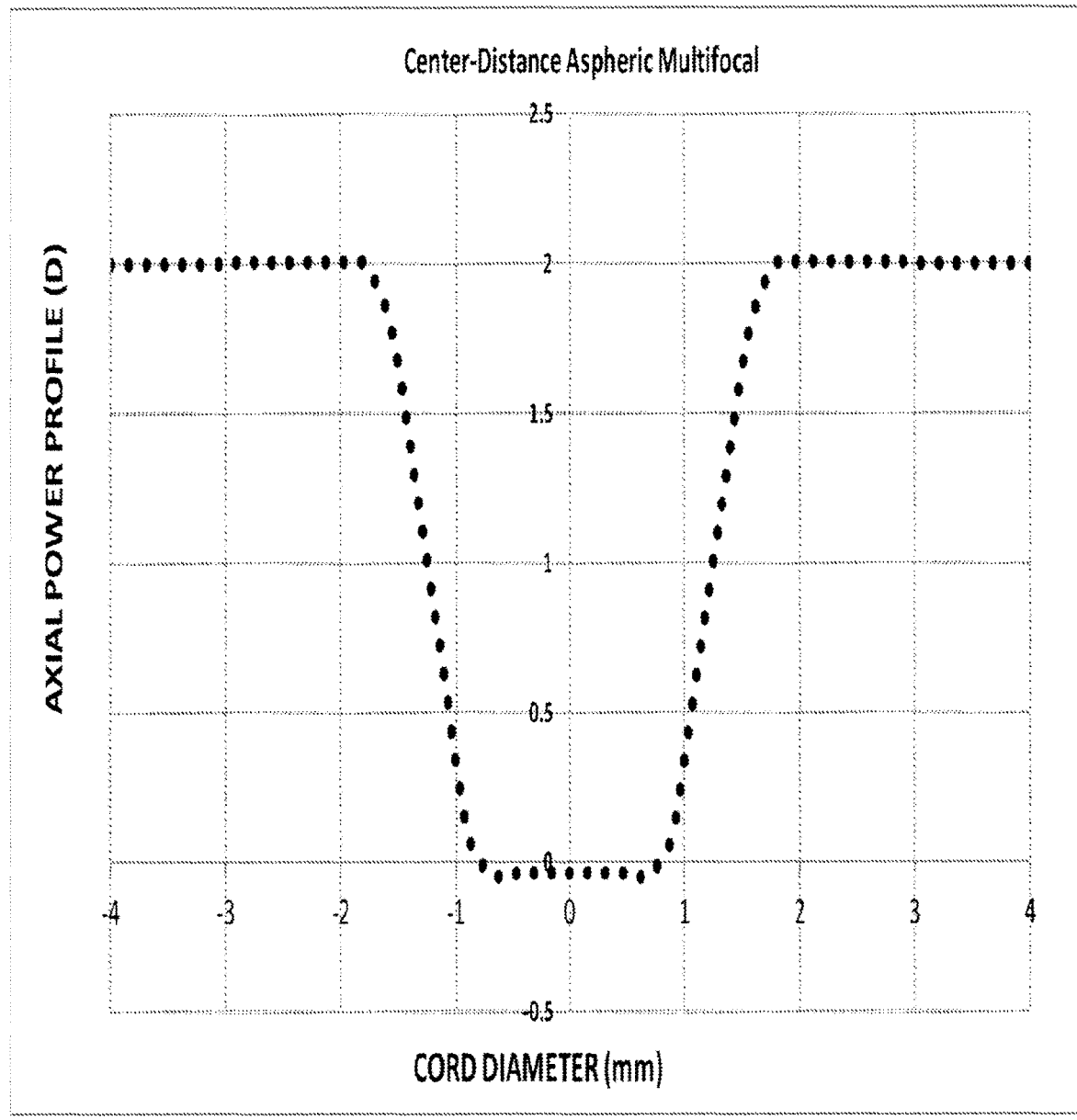
Figure 7C:
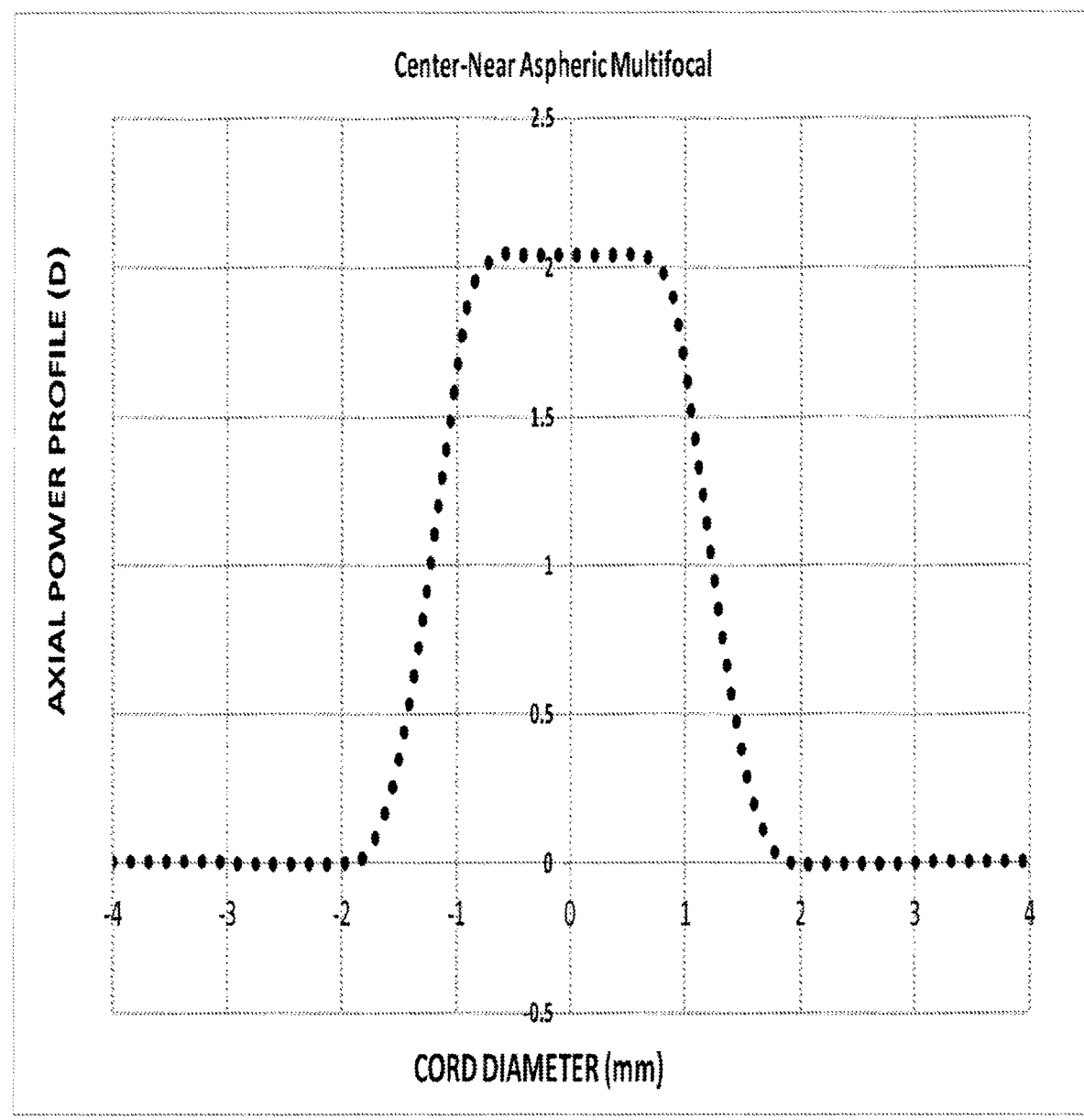

While variations in the power profile of the manufactured optic device may be acceptable, too much variation is not generally desirable. In certain embodiments, the more complex the nominal power profile is, the less tolerant it may be to variations. FIGS. 7 and 8 illustrate some of the differences between relatively simple power profiles and more complex power profiles. Accordingly, testing the power profile of the manufactured device to determine whether it is within an acceptable range of variation to the nominal power profile may be desirable.

Although the description herein generally discusses power profiles of manufactured optic devices, it should be generally understood by persons or ordinary skill in the art that equivalent and/or substantially equivalent methods and systems can also be applied to manufactured molds and/or cavities such as molds and/or cavities used in the manufacture of optic devices.

In exemplary embodiments, the power profile of the manufactured optic device may be tested by measuring the power profile of the manufactured device and comparing the measured power profile to the nominal power profile in an area of interest. In exemplary embodiments, the comparison of the two power profiles may include using parametric descriptors of the measured power profile. In exemplary embodiments, the parametric descriptors may be used to minimize (or at least reduce or substantially reduce) a statistical quantifier of the differences between the nominal power profile and the measured power profile. In exemplary embodiments, the statistical quantifier may be the sum of the squared differences between the measured power profile and the nominal power profile in the region of interest. One or more of the parametric descriptors in combination with the statistical quantifier may be used to determine whether the manufactured optic device meets certain predetermined criteria.

Figure 1:
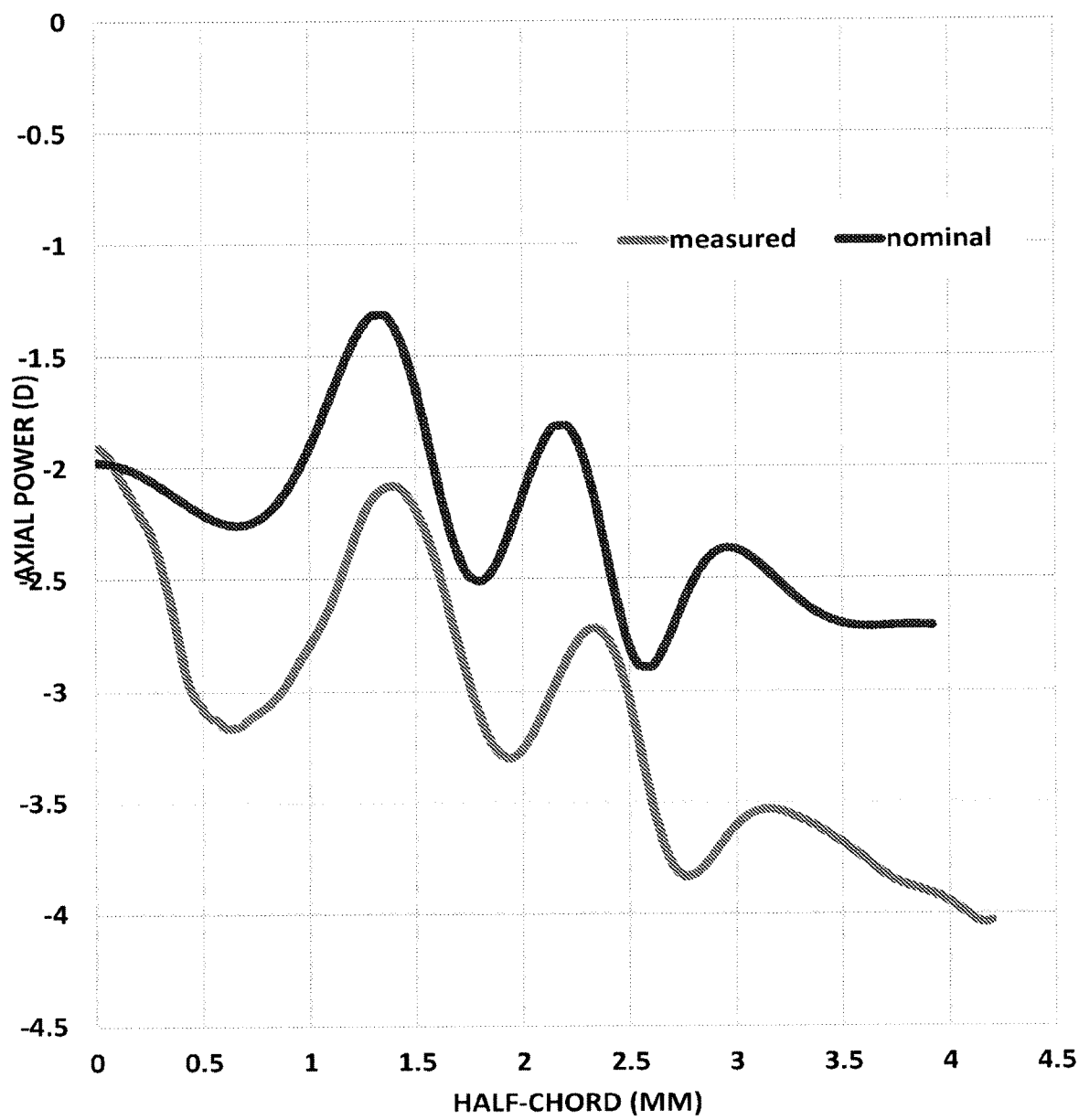
FIG. 1 is an exemplary illustration of a nominal power profile and a resulting power profile for a manufactured optic device.

FIG. 1 is an exemplary illustration of a nominal power profile and a resulting power profile for a manufactured optic device. As can be seen from the illustration, the measured power profile of the manufactured optic device is not identical to the nominal power profile. Exemplary embodiments described herein include methods and systems for determining whether the measured power profile is sufficiently close to the nominal power profile to meet the quality control guidelines established for the manufactured product. In exemplary embodiments, if the measured power profile does not meet the quality control guidelines, the manufactured optic device may fail the quality control process and be discarded or may be re-categorized. In exemplary embodiments, a root cause analysis/details can be extracted for understanding why the measured profile failed and what may need to be done to fix the problem.

To achieve this, in exemplary embodiments, the initial step may be to measure the power profile of the manufactured optic device. The power profile may be measured in a variety of manners. For example, commercially available power mapping instruments, based on e.g., phase shifting Schlieren method, Shack Hartmann wavefront sensors, ptychography or other suitable commercially available or custom built power mapping technologies may be utilized. Combinations of such instruments may also be used.

Figure 2:
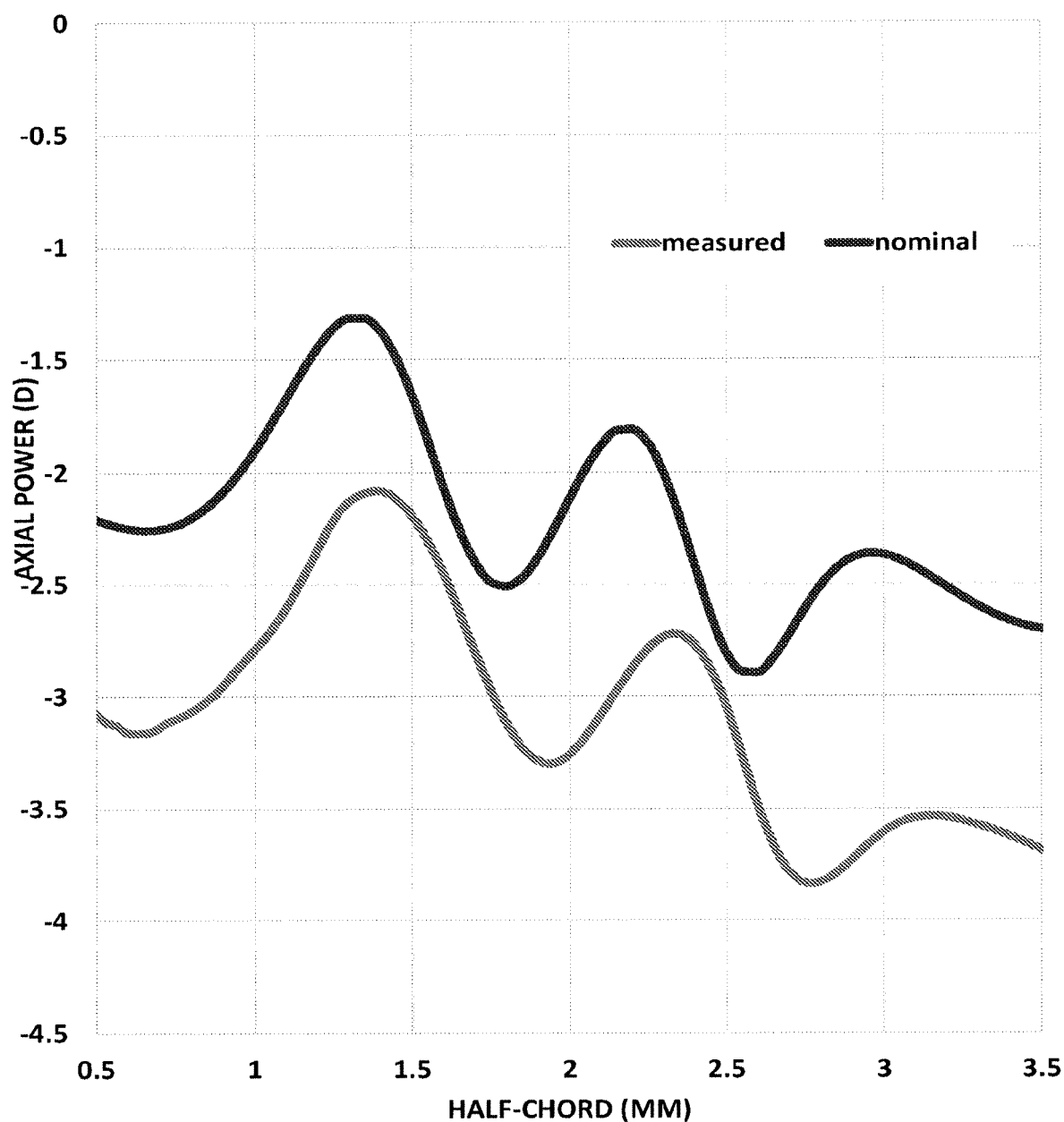
FIG. 2 is an exemplary illustration of the power profiles illustrated in FIG. 1 wherein the selected region of interest is 0.5 mm to 3.5 mm.

An exemplary measured profile is illustrated in FIG. 1. After measuring the power profile, the next step is to select one or more regions of interest to compare the measured power profile with the nominal power profile. FIG. 2 is an illustration of the power profiles illustrated in FIG. 1 wherein the selected region of interest is 0.5 mm to 3.5 mm on the half chord. Although the illustrated example in FIG. 2 shows the region of interest as 0.5 mm to 3.5 mm (half-chord), in exemplary embodiments, the region of interest could be the entire half chord or any other relevant region. For example, the region of interest may be 0-3.5 mm, 0-3 mm, 0-2.5 mm, 0-2 mm, 0-1.5 mm, 0-1 mm, 0-0.5 mm, 0.5-3.5 mm, 0.5-3 mm, 0.5-2.5 mm, 0.5-2 mm, 0.5-1.5 mm, 0.5-1 mm, 1-3.5 mm, 1-3 mm, 1-2.5 mm, 1-2 mm, 1-1.5 mm, 1.5-3.5 mm, 1.5-3 mm, 1.5-2.5 mm, 1.5-2 mm, 2-3.5 mm, 2-3 mm, 2-2.5 mm, 2.5-3.5 mm, 2.5-3 mm or 3-3.5 mm.

Figure 3:
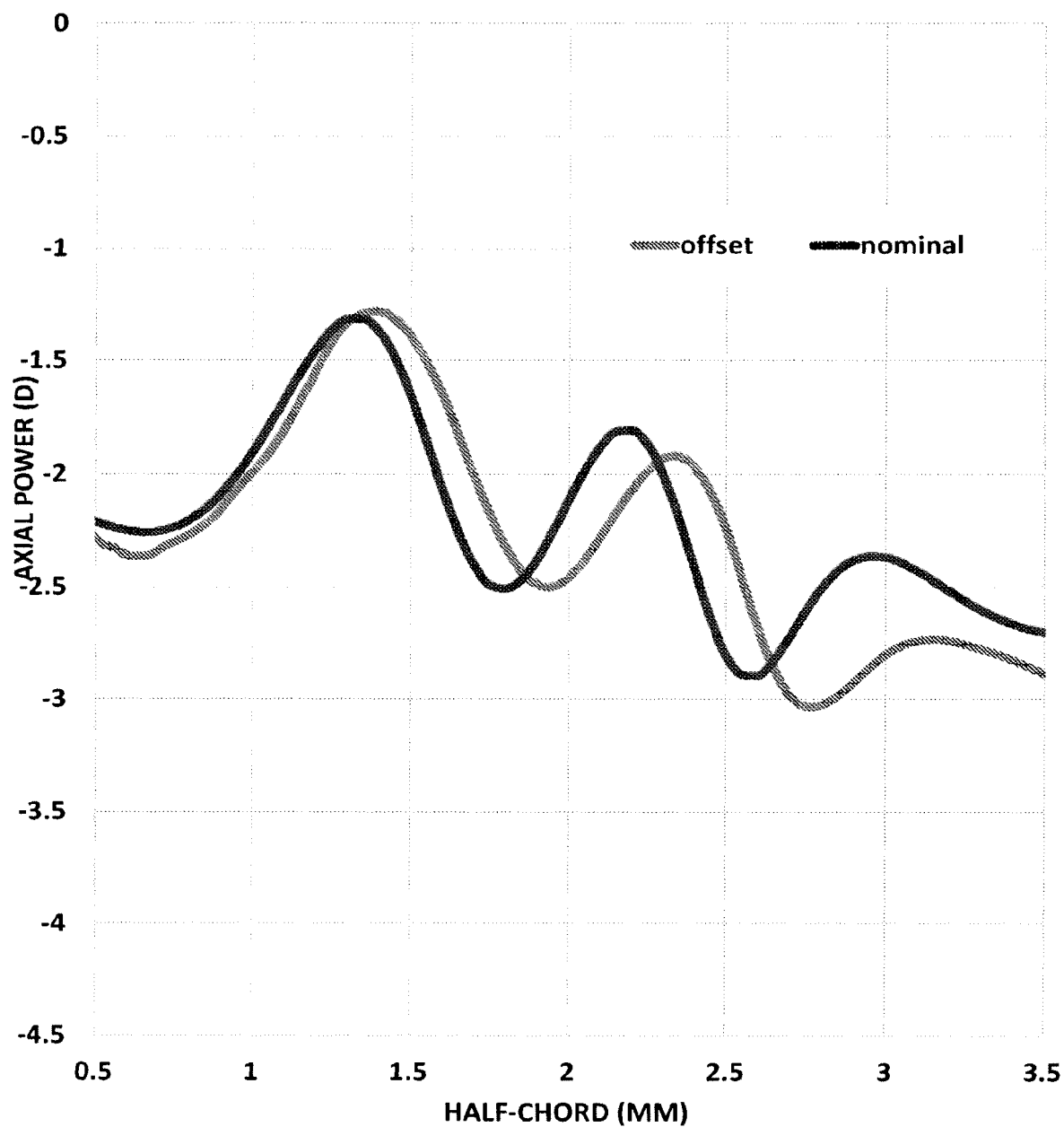
FIG. 3 is an exemplary illustration of the power profiles illustrated in FIG. 1 wherein the measured profile has a 0.75 diopter (D) offset.

After selecting the region of interest, an adjustment may be made to the measured power profile and the sum of the squared differences may be measured. In exemplary embodiments, other statistical quantifiers (e.g., procrustes distance) may be utilized as well. For example, FIG. 3 is an exemplary illustration of the measured profile with a 0.75 diopter offset. In exemplary embodiments, the offset may be selected to minimize (or at least approximately minimize) the sum of the squared differences. In exemplary embodiments, the process of selecting an offset may be iterative. In other words, an offset may be selected and then the resulting sum of the squared differences may be calculated. This process may be iterated until a minimum value of the sum of the squared differences is identified. In exemplary embodiments, the offset may be a single offset for the entire region of interest and the sum of the squared differences may be calculated at a plurality of measured points.

Figure 4:
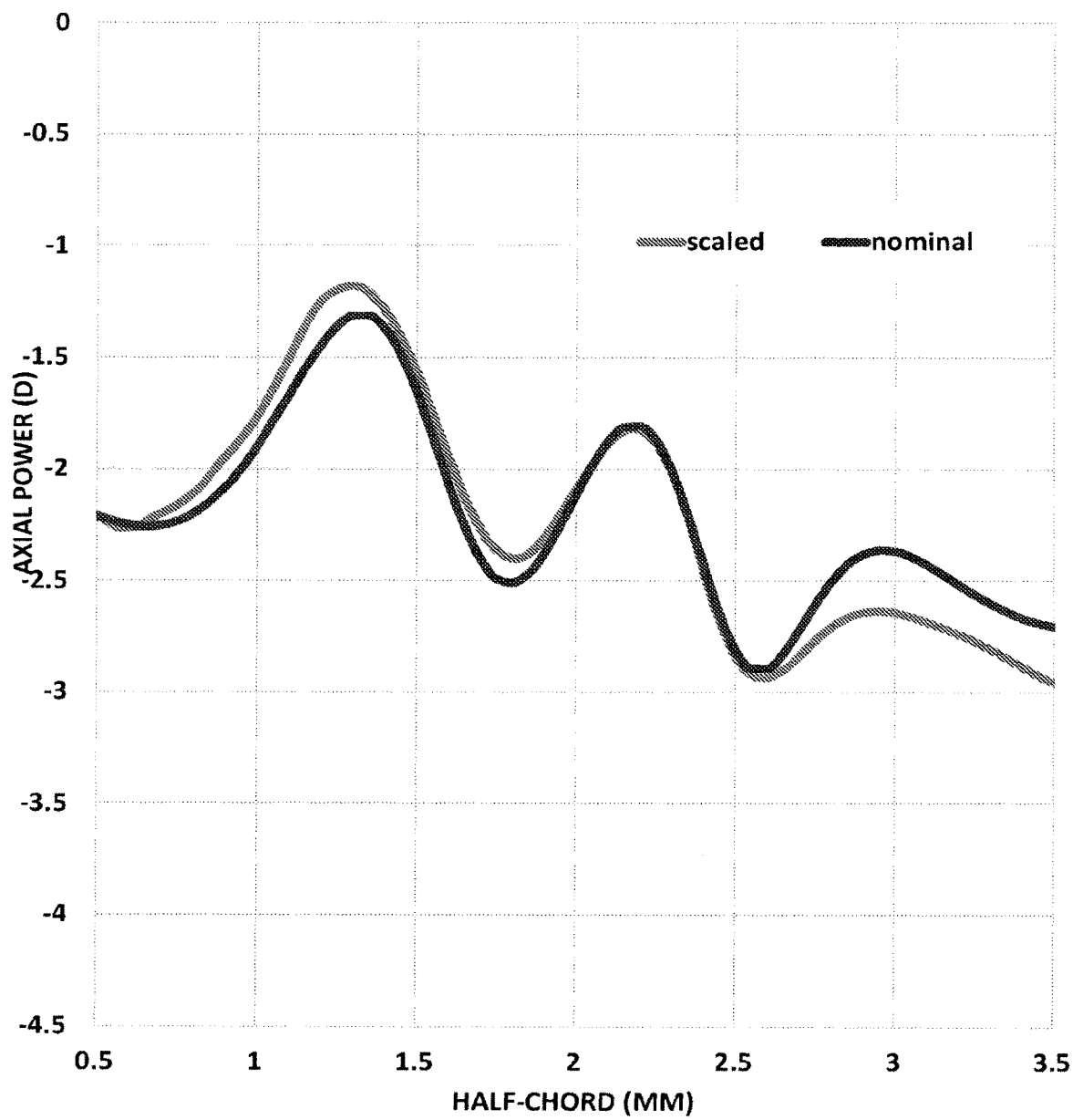
FIG. 4 is an exemplary illustration of the power profiles illustrated in FIG. 1 wherein the measured profile has a 0.75 diopter offset and is scaled by 1.09.

After applying the offset, a further adjustment may be made to the measured profile and the resulting sum of the squared differences may be calculated. For example, FIG. 4 is an exemplary illustration of the power profiles illustrated in FIG. 1 wherein the measured profile has a 0.75 diopter offset and is scaled along the half chord axis by 1.09. In exemplary embodiments, the scale may be selected to minimize (or at least approximately minimize) the sum of the squared differences. In exemplary embodiments, the process of selecting a scale factor may be iterative. In other words, a scale may be selected and then the resulting sum of the squared differences may be calculated. This process may be iterated until a minimum value of the sum of the squared differences is identified. In exemplary embodiments, the scale may be a single offset for the entire region of interest and the sum of the squared differences may be calculated at a plurality of measured points. Although the scale is illustrated as having been applied after an offset is applied, alternative orders may be acceptable as well and different combinations of parameters may be utilized. In exemplary embodiments, the offset may also be along the half chord. In exemplary embodiments, the offset may be a laterally shifted offset.

Figure 5:
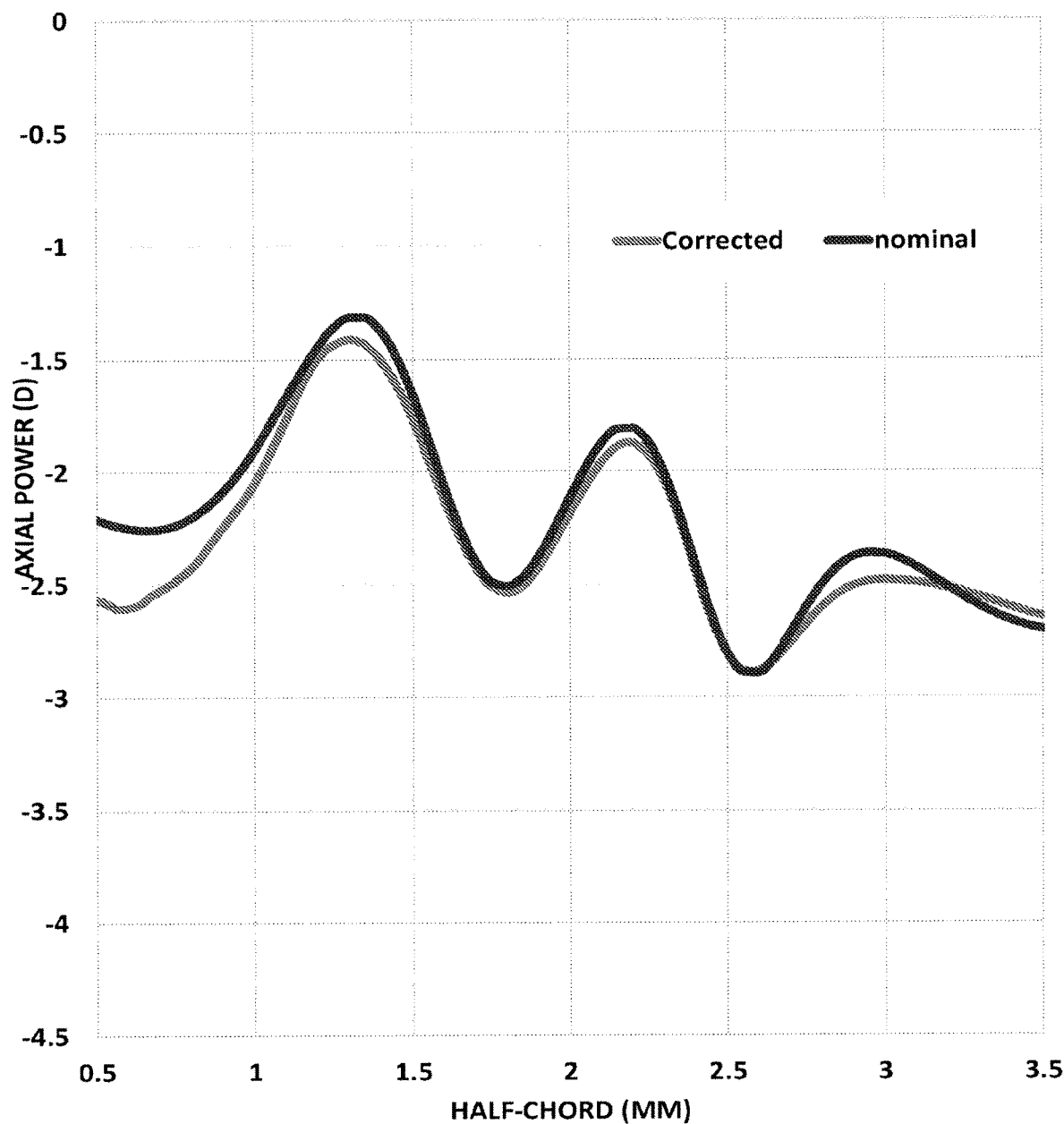
FIG. 5, is an exemplary illustration of the power profiles illustrated in FIG. 1 wherein the measured profile has a 0.75 diopter offset, is scaled by 1.09, and an asphericity of −0.65 diopters is applied.

After applying the offset and the scaling, a further adjustment may be made to the measured profile. For example, FIG. 5 is an exemplary illustration of the power profiles illustrated in FIG. 1 wherein the measured profile has a 0.75 diopter offset, is scaled by 1.09, and an asphericity of −0.65 diopters is applied. In exemplary embodiments, the asphericity (or slope correction) may be calculated by fitting a quadratic function to the differential profile (nominal power profile—measured power profile). As may be readily understood by persons of ordinary skill in the art, asphericity is may be introduced into contact lenses due to anisotropic expansion behavior of the material during hydration.

After obtaining the desired parameters, and associated statistical quantifier, various combinations of the parameters and statistical qualifiers may be utilized to determine if the manufactured optic product passes a quality control check. In exemplary embodiments, if the manufactured optic product does not pass the quality control check, the product may be discarded or re-categorized. For example, in exemplary embodiments, the offset and the corresponding sum of the squared differences may be utilized to determine whether a manufactured optic device meets a predetermined quality standard. The standard may be quantified in such a way that the device passes the standard if the offset is less than 0.25 diopters and the corresponding sum of the squared differences is less than 4 $D^2$. Looking at the measured power profile in FIG. 3, the offset was 0.75 diopters. Accordingly, even if the sum of the squared differences was less than 4 $D^2$, the device would not pass the quality standard and therefore the lens may be discarded. Alternatively, the lens may be re-categorized. In this situation, there may be another desirable nominal power profile that the product may be sufficiently close to. In this situation, the standard for the offset may be that the product fails if the offset is more than 0.25 diopters but is re-categorized if the offset is 0.75-1.25 diopters. In the case of the power profile in FIG. 3, the device may be re-categorized because it is sufficiently close to another desirable profile.

In exemplary embodiments, various combinations of the offset, the scale, the asphericity (or slope correction), and the corresponding statistical quantifiers (e.g., sum of the squared differences) may be utilized to determine whether a manufactured optic device meets certain predefined quality control requirements.

In exemplary embodiments, the devices that do not meet the requirements may fail the quality control phase of manufacturing or may be re-categorized as an alternative product. In exemplary embodiments, the method may assign a label power (e.g., dioptric power) to the manufactured optic device. For example, the method may assign a label power or reassign a label power if the device does not meet the requirements of the quality control phase.

In exemplary embodiments, this quality control process may be implemented during the manufacturing process of the manufactured optic product. In exemplary embodiments, all manufactured optic products may be tested after manufacture or at some stage in the manufacturing process. In exemplary embodiments, a substantial portion of the manufactured optic products may be tested after manufacture or at some stage in the manufacturing process. In exemplary embodiments a portion of the manufactured optic products may be tested after manufacture or at some stage in the manufacturing process. In exemplary embodiments at least 1 in 1000, at least 1 in 500, at least 1 in 250, at least 1 in 100 or at least 1 in 20 may be tested after manufacture or at some stage in the manufacturing process. In exemplary embodiments, alternating products may be tested. In exemplary embodiments, the products may be tested in a random (or pseudorandom) manner. In exemplary embodiments, 1 out of about 5 lenses may be tested. For example, 1 out of 2, 1 out of 3, 1 out of 4, 1 out of 5, 1 out of 6, 1 out of 7, 1 out of 8, 1 out of 9 or 1 out of 10 lenses may be tested. In exemplary embodiments, the quality control process may occur in real time or substantially real time or other suitable times in which the quality control process is implemented. In exemplary embodiments, a single lens may be checked in substantially real time.

In addition, the optic products may be manufactured on high speed manufacturing lines (e.g., a manufacturing line capable of producing 15, 20, 25, 30, 40, 45, 50, 55, 60, 65, 70, 75, 80, 85, 90, 95, or 100 optic devices per minute. In this situation, the testing may or may not be performed in substantially real time without significantly impacting the speed of the line. For example, in a manufacturing situation, the addition of the testing procedure described herein may reduce the output of the manufacturing line by less than 1%, 2%, 3%, 4%, 5%, 10%, or 15%, etc.

Figure 6:
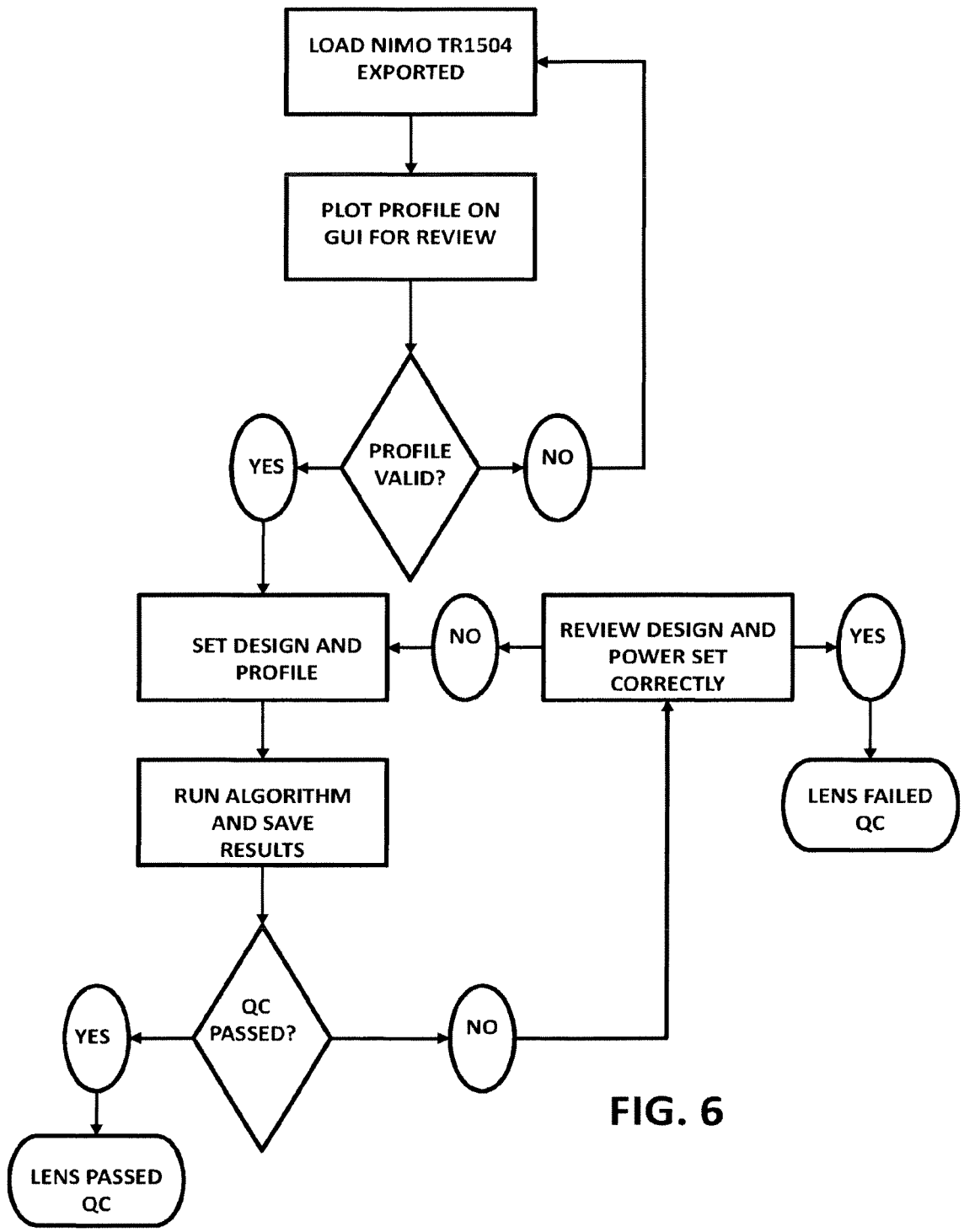
FIG. 6 is an exemplary flow diagram of a process for determining whether a manufactured optic device satisfied predetermined quality control metrics.

FIG. 6 is an exemplary flow diagram of a process for determining whether a manufactured optic device satisfied predetermined quality control metrics. In exemplary embodiments, the manufactured optical device may be measured using a Lambda-X NIMO TR1504. After measurement, the profile may be loaded into the comparison system. The system may perform an initial check to determine whether the measured profile is valid. If the system determines the profile is valid, the measured profile is selected and compared against a nominal power profile. After the comparison, the system determines whether the measured profile is similar enough (e.g., within certain tolerances) to the nominal profile to meet defined quality parameters. If the quality control standard is not met, the process reviews whether the design and power were set correctly. If they are, the manufactured device fails the quality check. If the parameters were not correct, they are reset and the comparison is performed again. If the manufactured optical device does meet the quality control standard it passes the quality check.

In exemplary embodiments, the system may comprise a processor programmed to perform the comparison described herein, using MATLAB or similar software. In exemplary embodiments, the user interface may be a graphical user interface.

In exemplary embodiments, the system may compare measured values from the Lambda-X NIMO instrument with a nominal optical power profile for a lens profile and determine whether the measured values are within tolerance of the nominal values, reporting a pass/fail result together with a label power.

As discussed herein, in exemplary embodiments, the criteria used for quality control may be the sum of squared differences (SSD) between the measured and the nominal profile (e.g., failure if the SSD is more than 25 $D^2$, 20 $D^2$, 15 $D^2$, 10 $D^2$, or 5 $D^2$). This criteria may be modified by dividing the SSD result by the number of summated points to make it independent of the selected region or regions of interest. Alternatively, the area between the measured and nominal profiles can be calculated over the region(s) of interest. This area may then be divided by the total distances along the diameter of the selected region(s) of interest to obtain an average error in dioptric units. For any of these examples, a weighing factor may be applied that, for example, gives more weight to certain regions along the diameter range. In exemplary embodiments, the system may also return metrics for suitable combinations of scale (e.g., stretching or shrinking or offsetting along the diameter of the measured profile when compared to the nominal profile), asphericity (or slope correction) (e.g., linear (tilt) or elliptical error between the measured and nominal profile) and/or data for peak to valley ratios within the measured power profile compared to the nominal power profile. In exemplary embodiments, the metrics may be determined at equally spaced (e.g., 0.005, 0.0075, 0.01, 0.015 or 0.02 mm) sampling points.

In exemplary embodiments, the metrics/variable may include combinations of the metrics in the table below.

| Variable name | Description | Exemplary Process to Determine |
|---|---|---|
| Offset Y | The dioptric offset that best matches the measured profile with the nominal profile. | An offset (from e.g., −6.00 D to +6.00 D, inclusive of 0 D) is applied to the measured profile in e.g., 0.01D steps and the difference (e.g., sum of squared differences) between the offset-measured and nominal power profile is calculated. The offset yielding the smallest difference is returned. |
| Offset X | The offset on the x-axis that | An offset (from e.g. −0.5 mm to +0.5 |

| Variable name | Description | Exemplary Process to Determine |
|---|---|---|
| | best matches the measured profile with the nominal profile | mm, inclusive of 0 mm and applied in e.g. 0.001 mm steps) is applied to the x values of the measured profile and the difference (e.g., sum of squared differences) between the offset-measured and nominal power profile is calculated. The x-offset yielding the smallest difference is returned. |
| offsetDMvsN | offset (above) rounded to e.g., the next 0.25D | The offset variable may be rounded to the nearest 0.25 D step to yield a dioptric (D) value to be used as an offset that can be used to re-label the power of the measured lens. |
| Scale | The scale factor that best matches the measured profile with the nominal profile. | A scale factor may be applied to the measured profile by multiplying the original x values by a factor of e.g., 0.8 to 1.2 in e.g., 0.001 mm steps and the difference (e.g., sum of squared differences) between the scaled-measured and nominal power profile is calculated. The scale factor yielding the smallest difference is returned. |
| Asphericity (or slope correction) | The magnitude of the second order polynomial function that best fits the differential profile (measured − nominal). | The nominal profile is subtracted from the measured profile. A second order polynomial (e.g., matlab fittype = 'poly2') is then fitted to the resulting profile (e.g., difference profile). The difference between the last and the first point in the determined best fit second order polynomial is returned. |
| ampltd_nom, ampltd_meas | Two arrays holding the magnitude of the dioptric difference between peak and valley in the nominal and measured profile. | The location of peaks and valleys in the measured and nominal profiles are determined. The spatial and dioptric differences between all (or some) peak and valley locations in the nominal and measured profile are returned. |
| SSD | The sum of squared differences (in $D^2$) between the measured and the nominal power profile after applying offset. | The sum of squared difference between the measured (after applying offset) and the nominal profile are calculated and returned. |

In exemplary embodiments, users may not be able to change the comparison calculation. However, certain parameters within the comparison may be configurable by the user. For example, in exemplary embodiments, the label power may be adjustable from the nominal or aim power by ±0.10, 0.20, 0.25, 0.30, 0.40 or 0.50 D.

In exemplary embodiments, the nominal optical power profiles may be hardcoded into the system of the system may be capable of accepting profiles provided by the user.

Figure 8A:
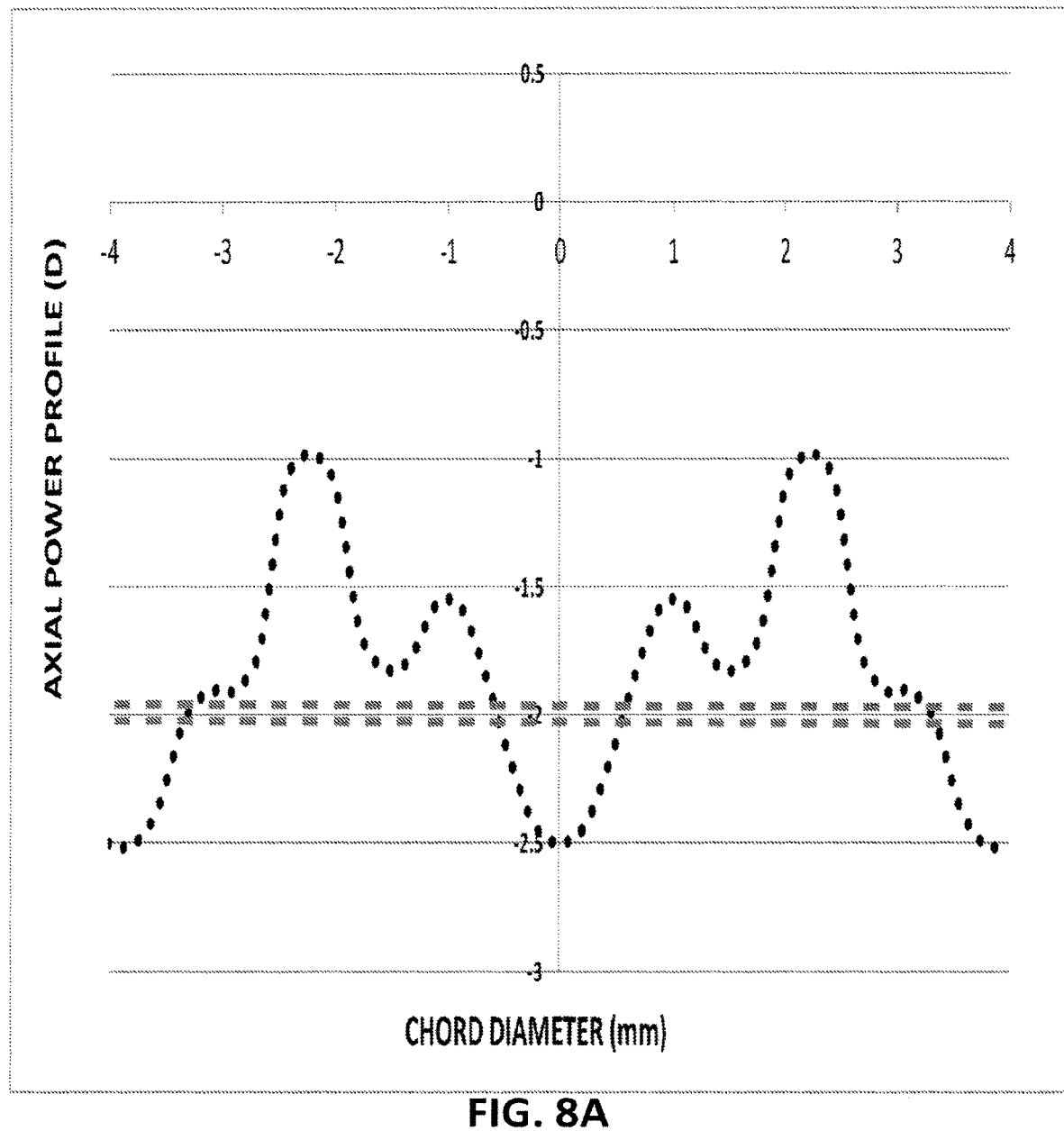
FIGS. 8A-8W are exemplary power profiles which are typically considered to be complex power profiles as the term is used herein.
Figure 8B:
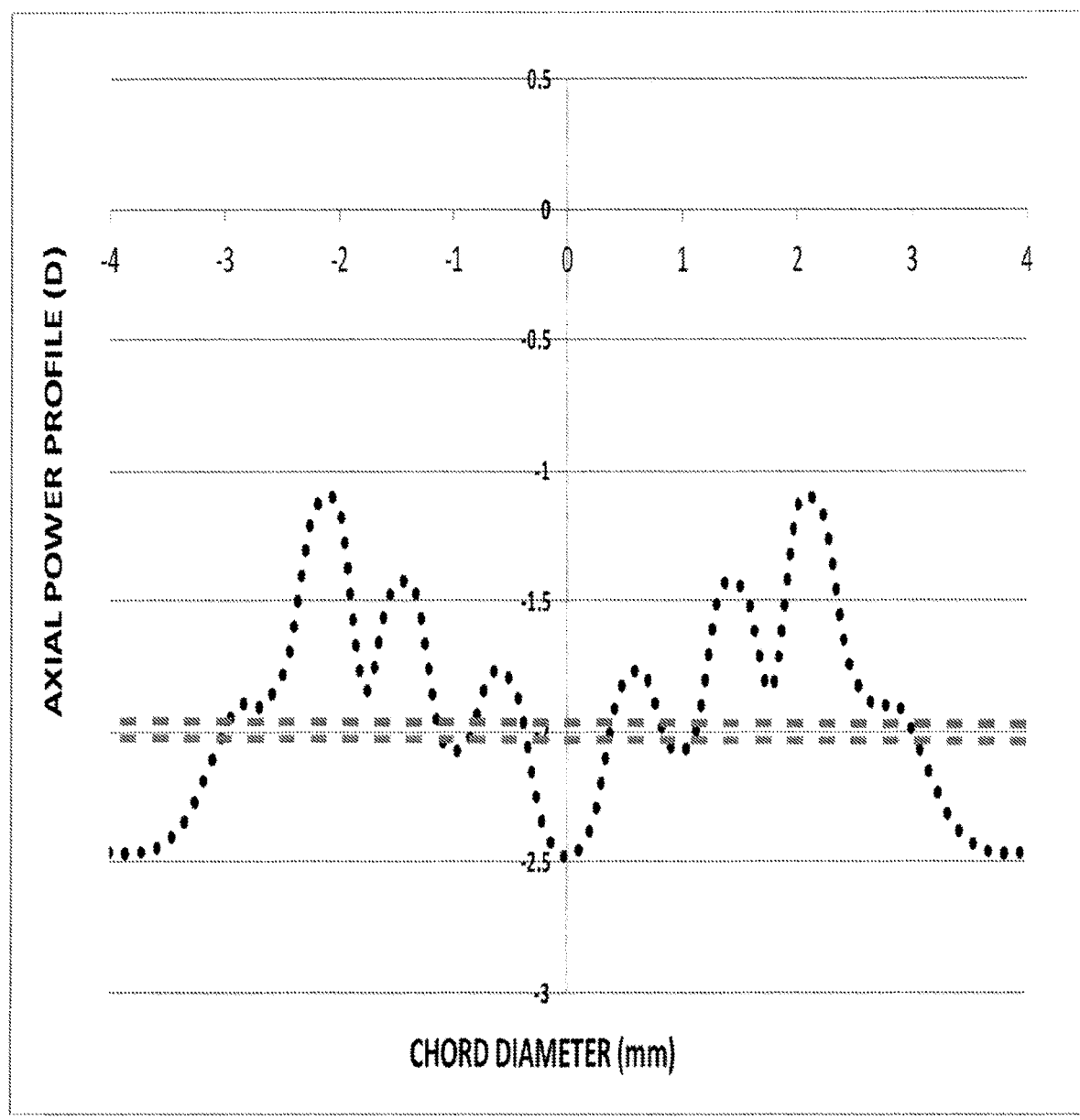
Figure 8C:
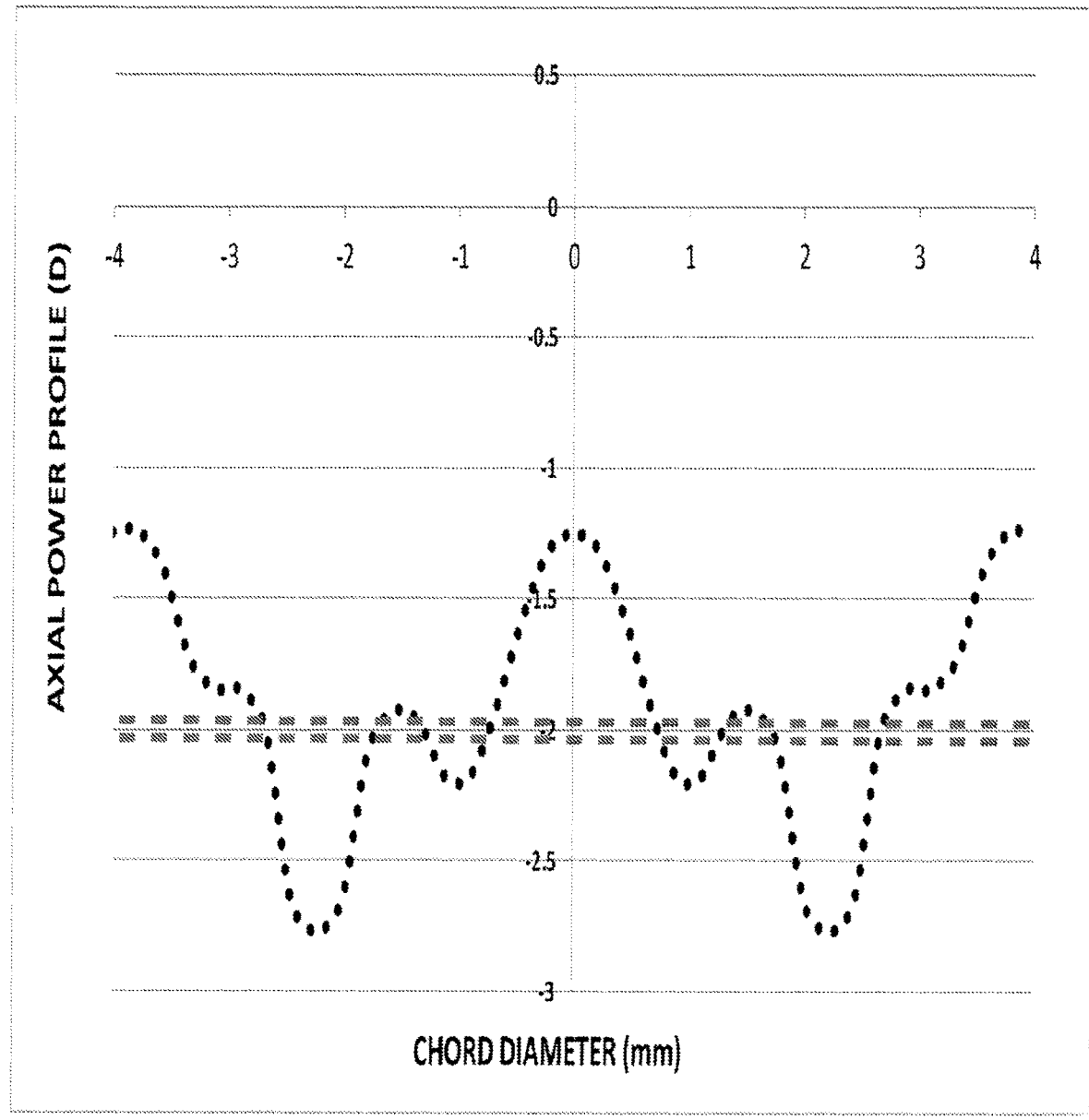
Figure 8D:
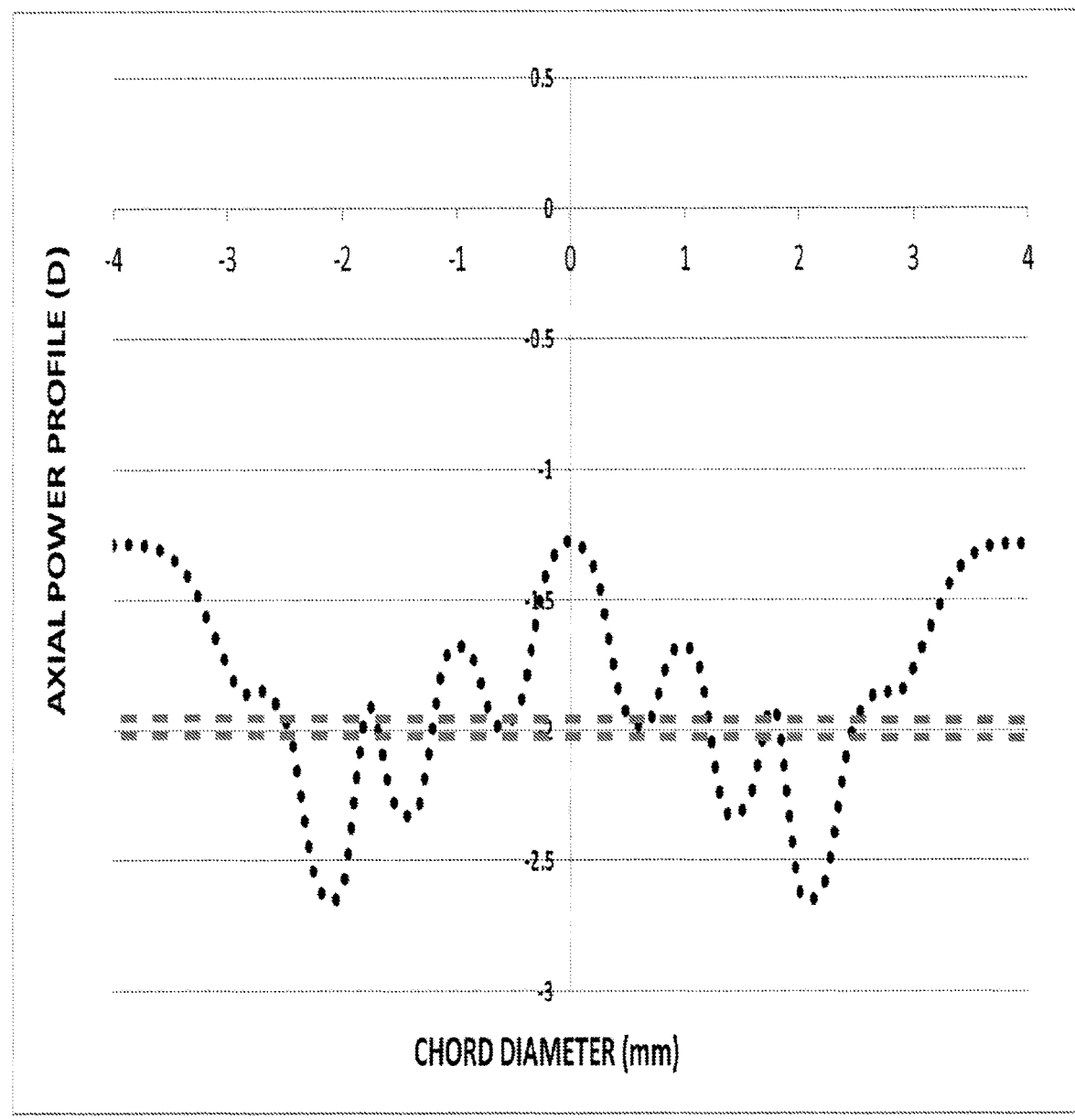
Figure 8E:
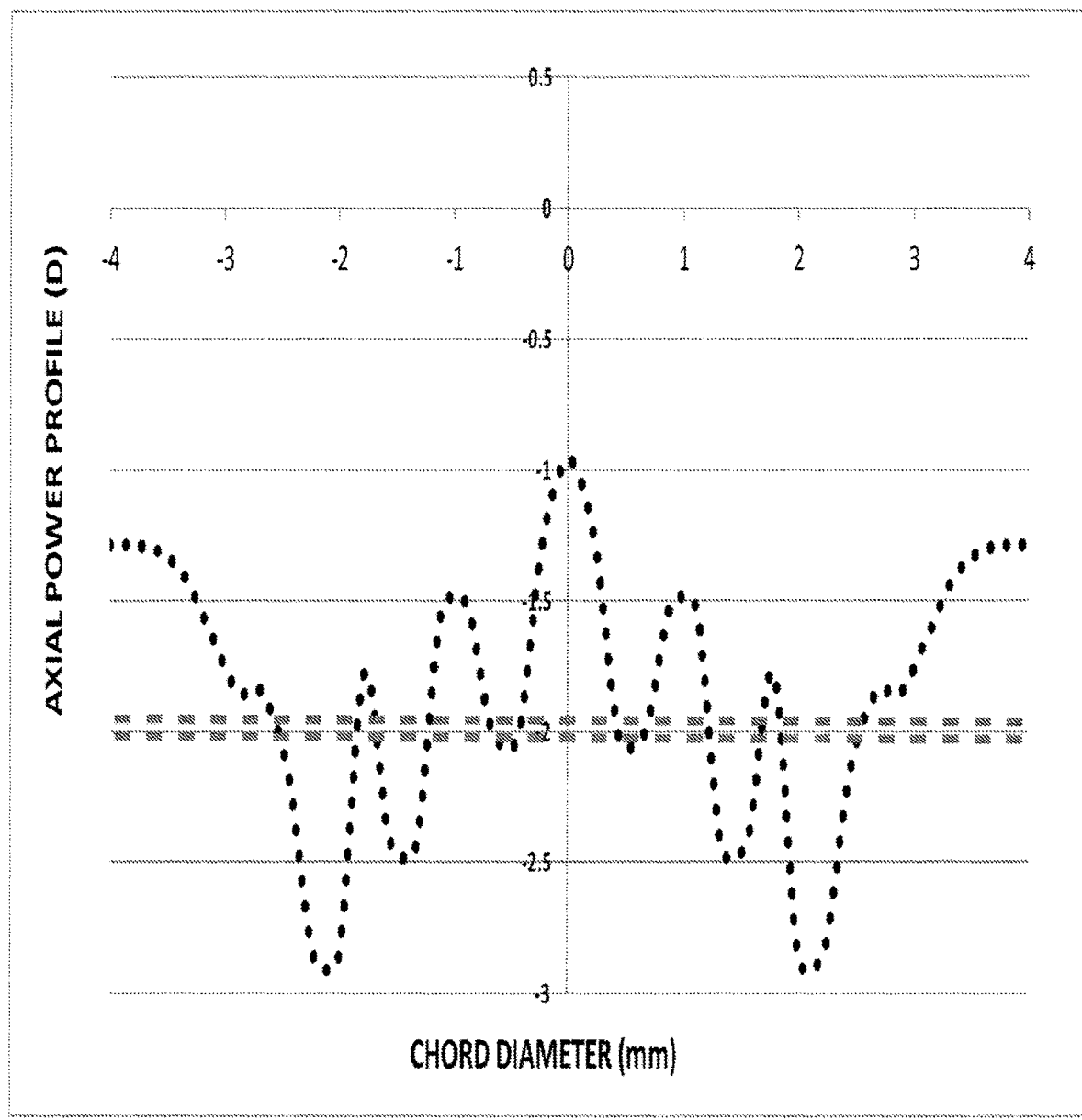
Figure 8F:
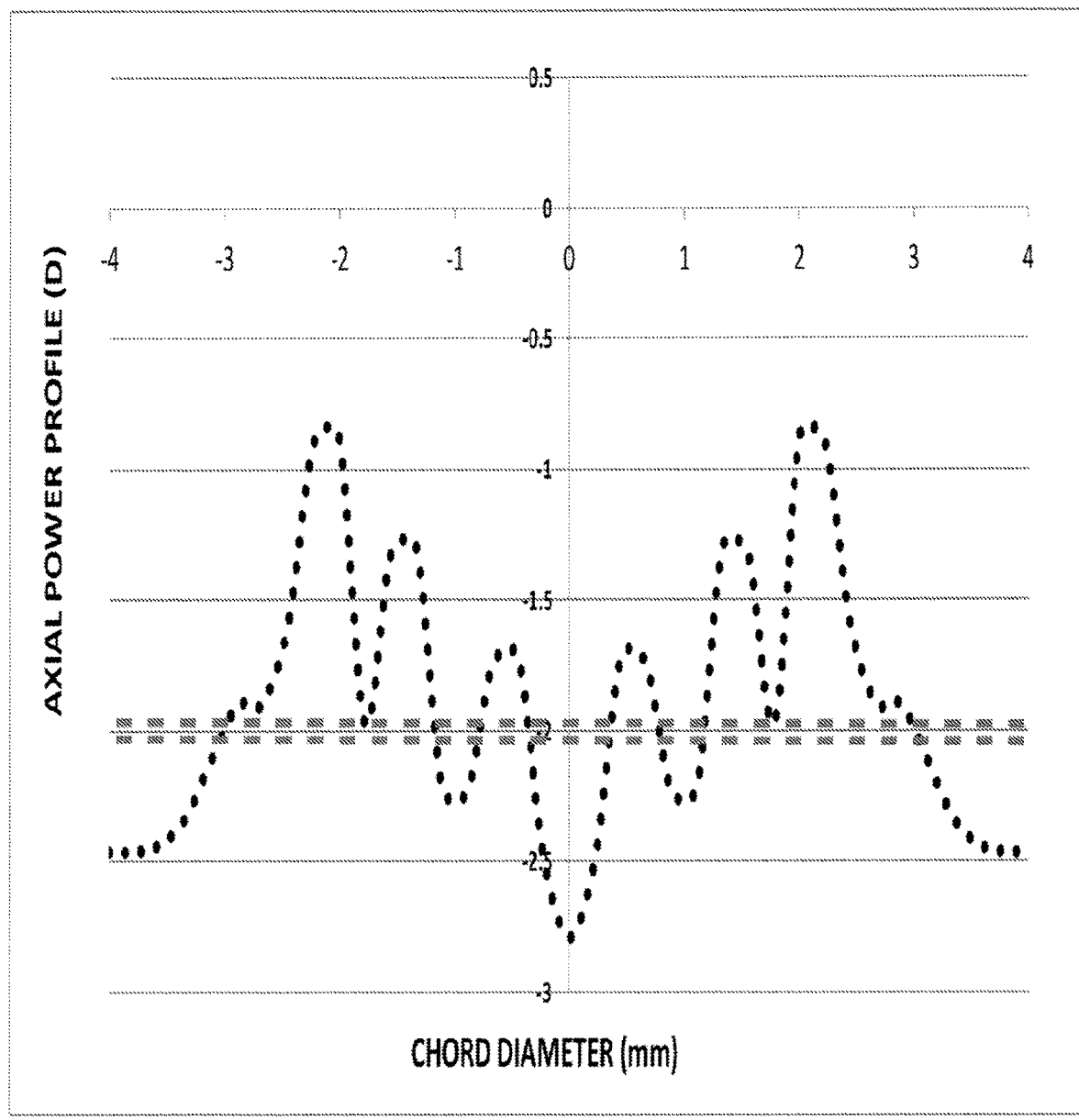
Figure 8G:
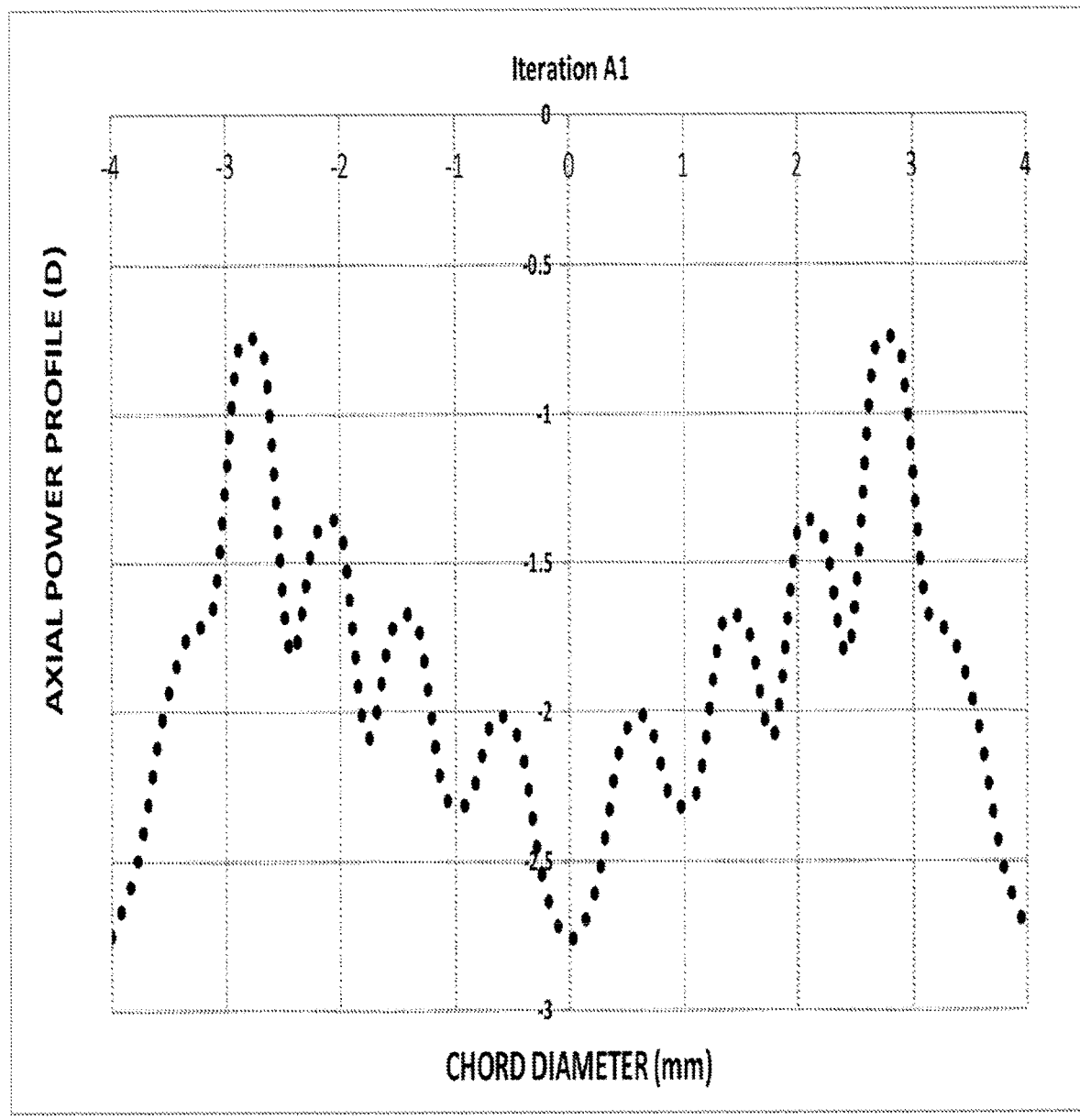
Figure 8H:
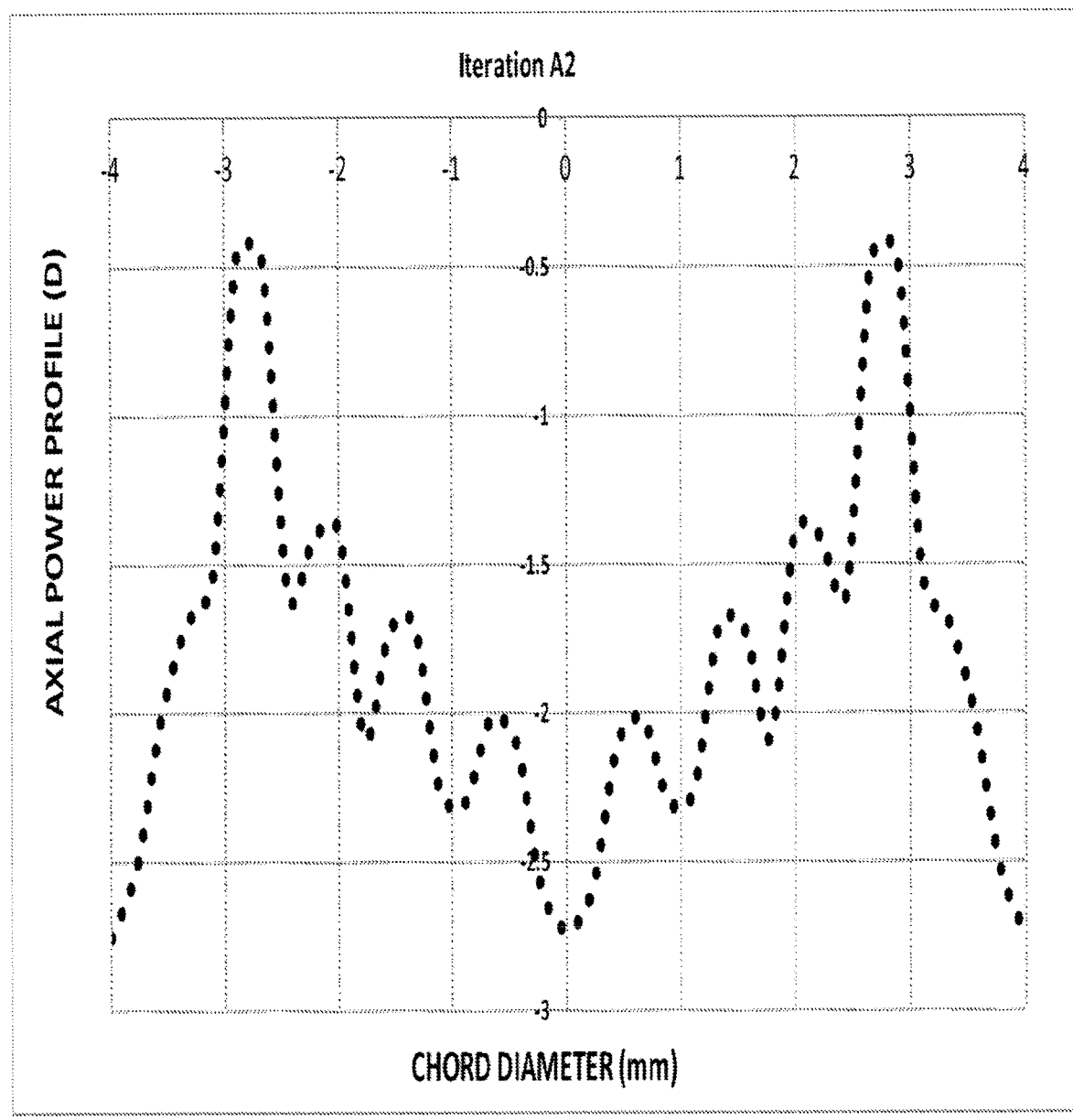
Figure 8I:
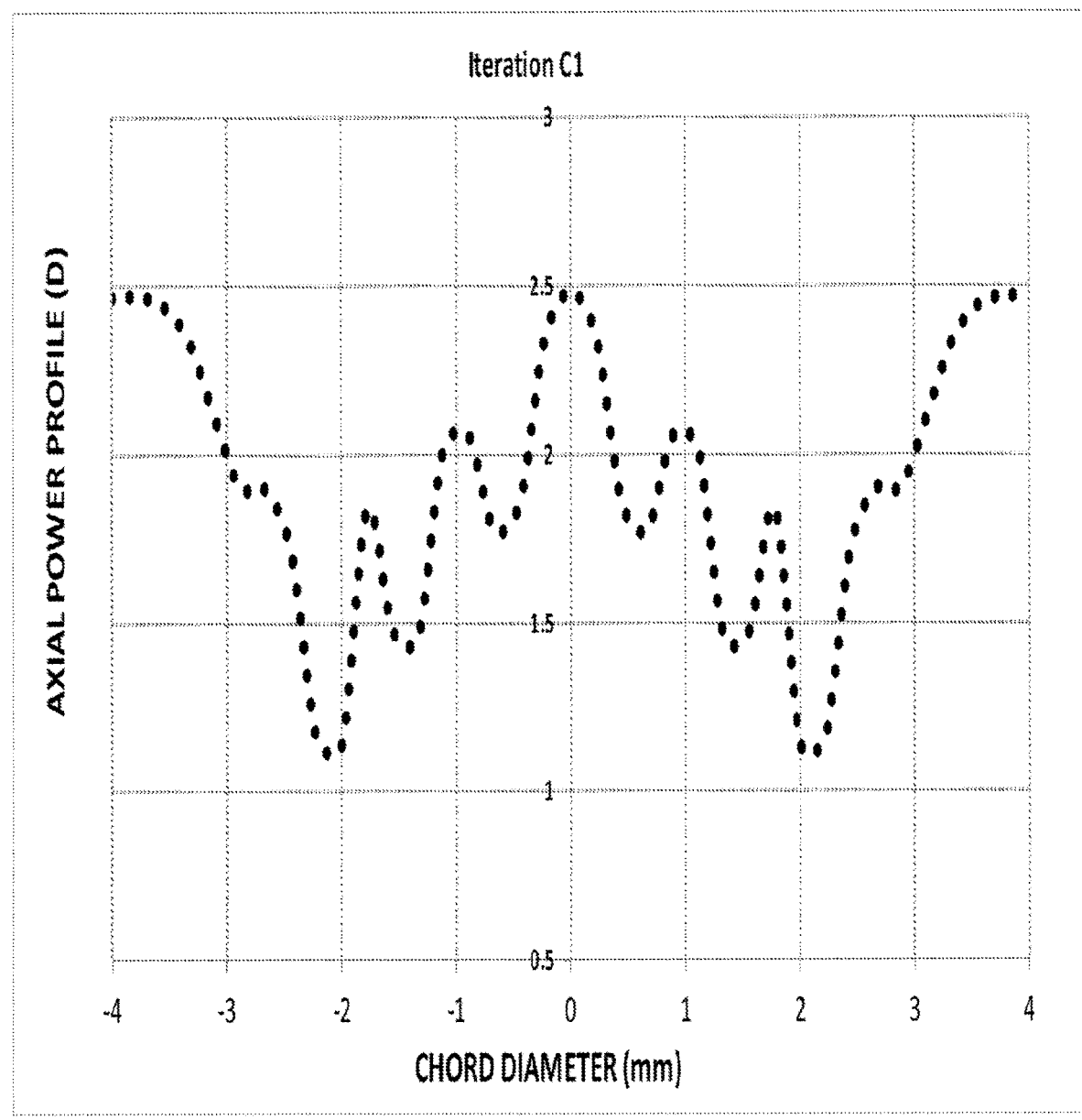
Figure 8J:
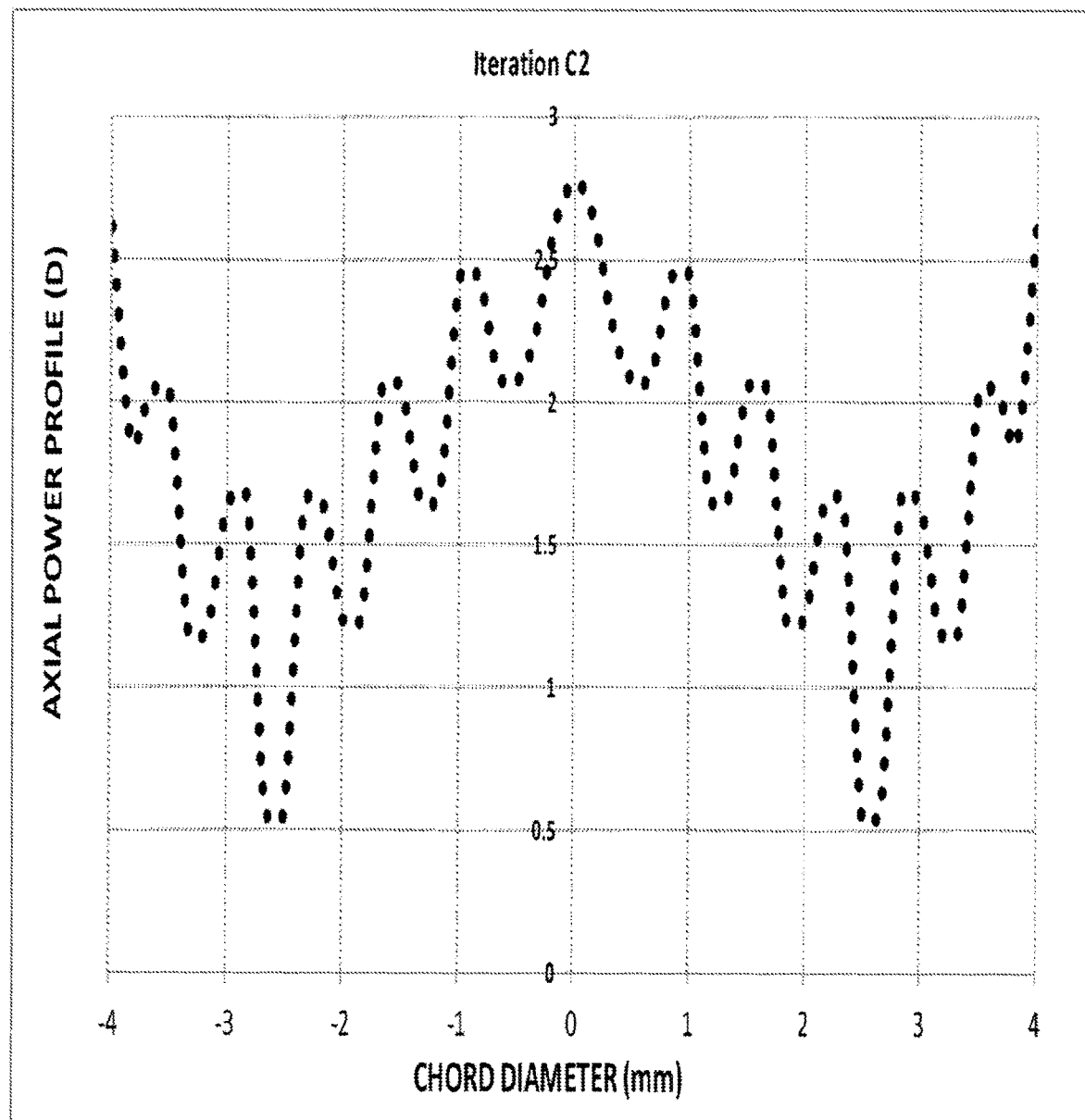
Figure 8K:
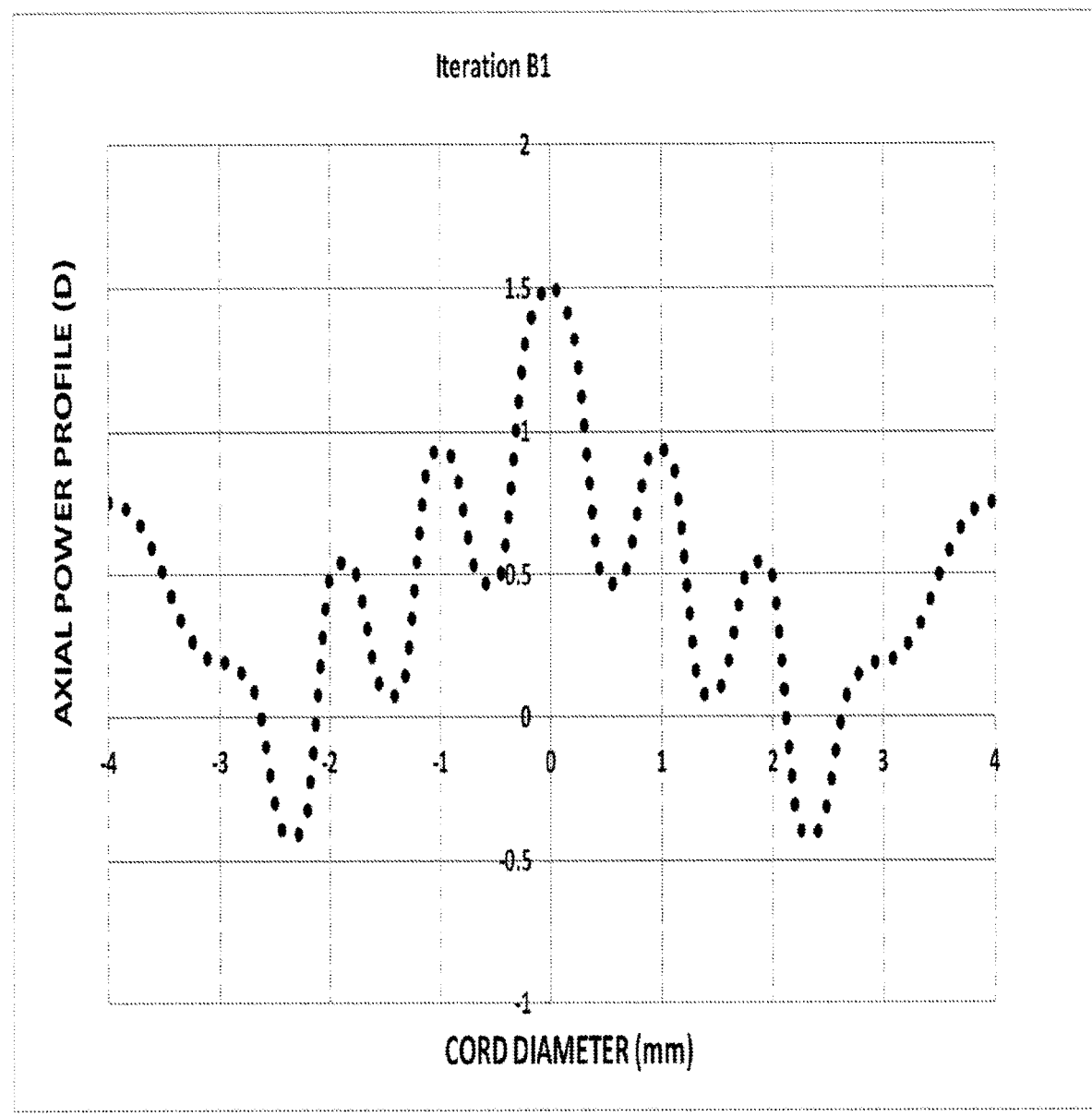
Figure 8L:
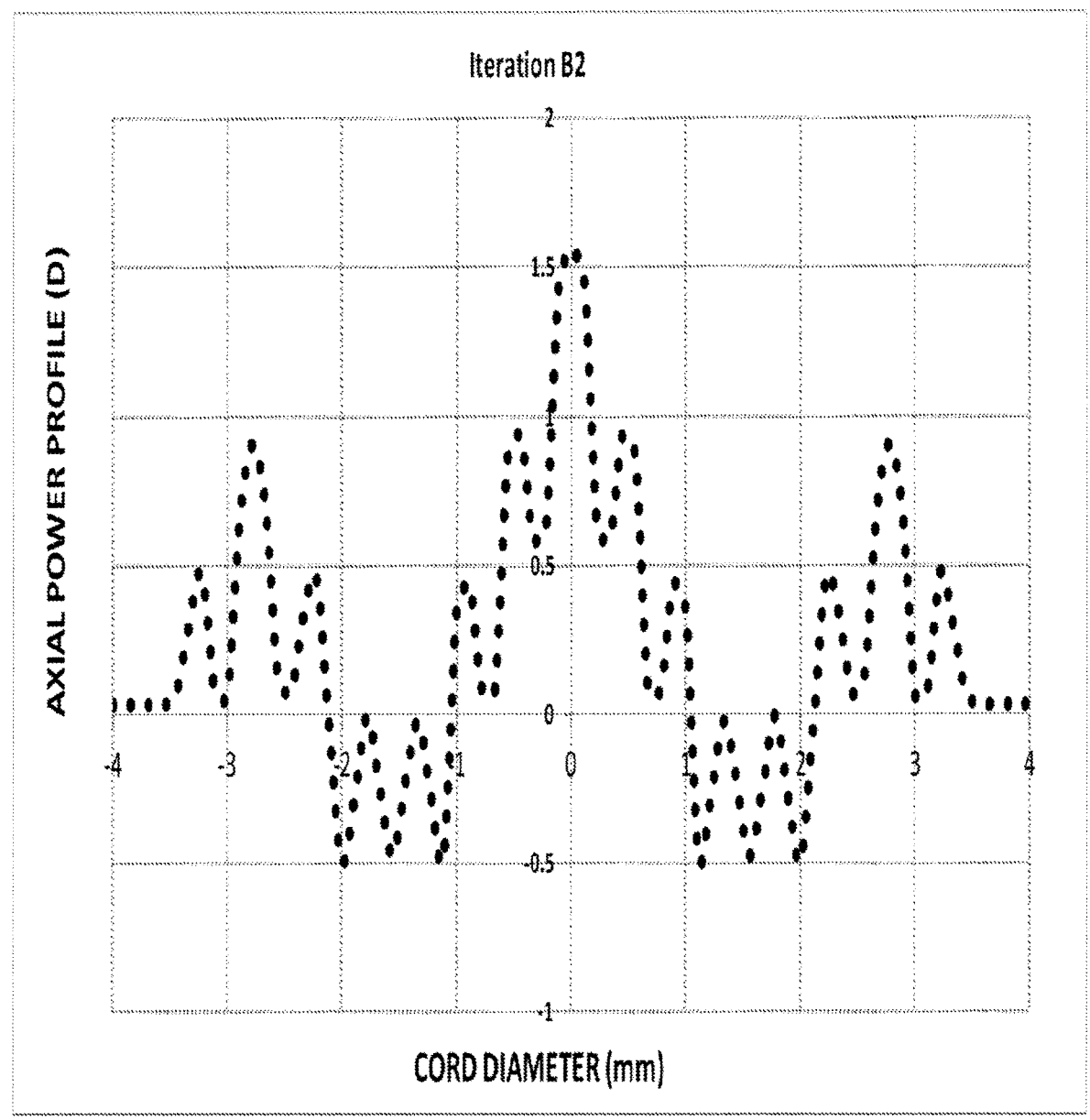
Figure 8M:
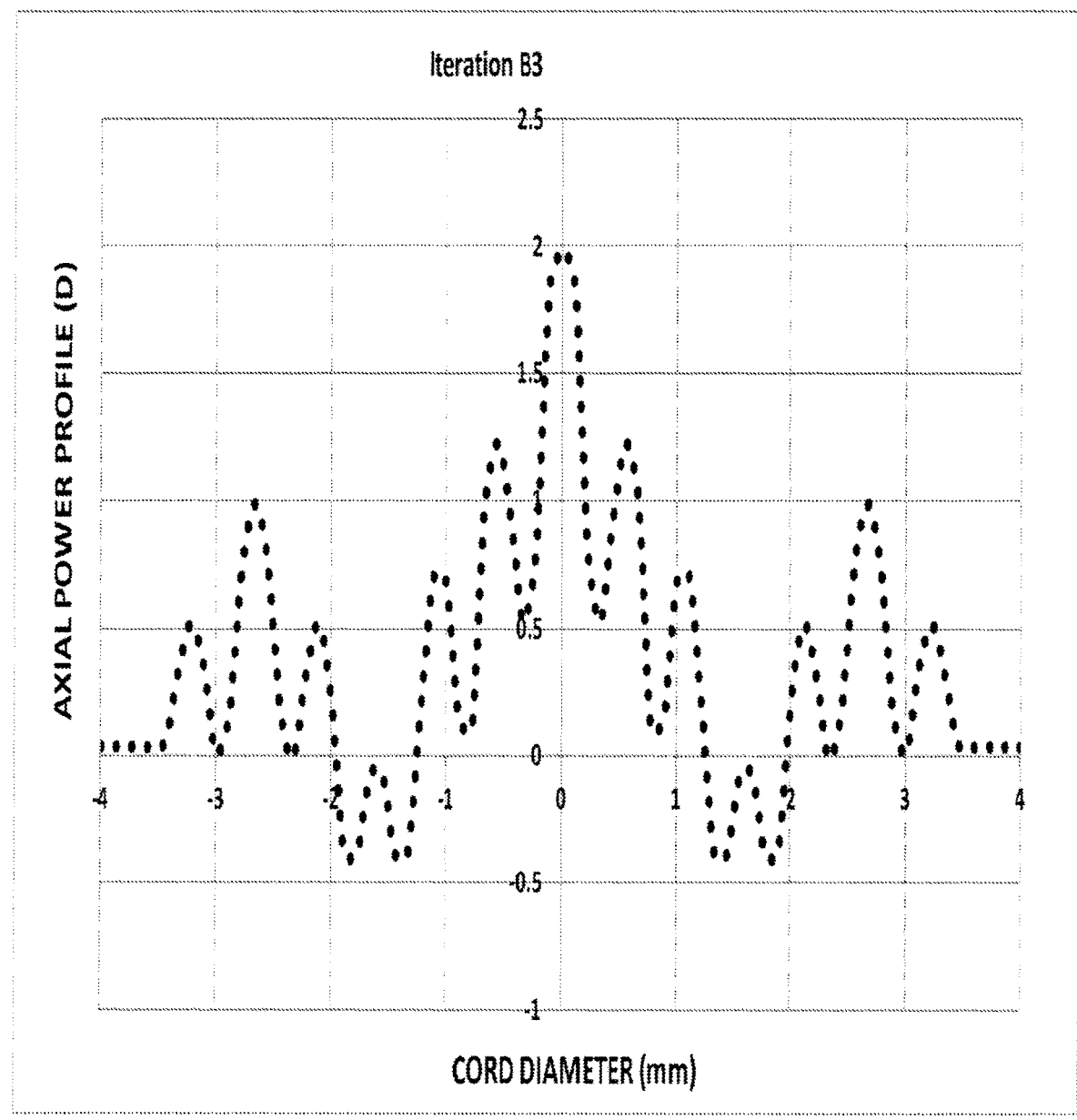
Figure 8N:
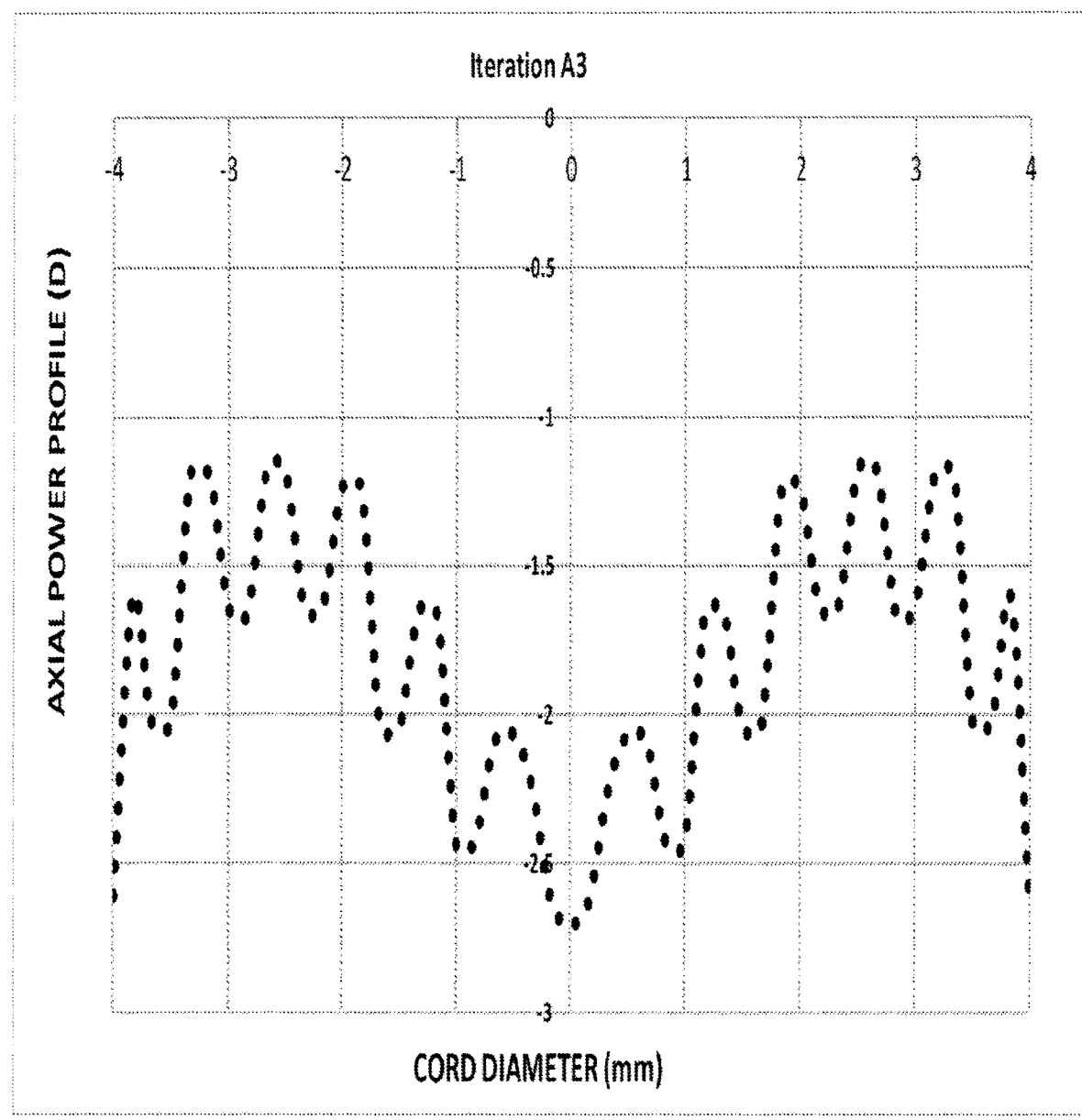
Figure 8O:
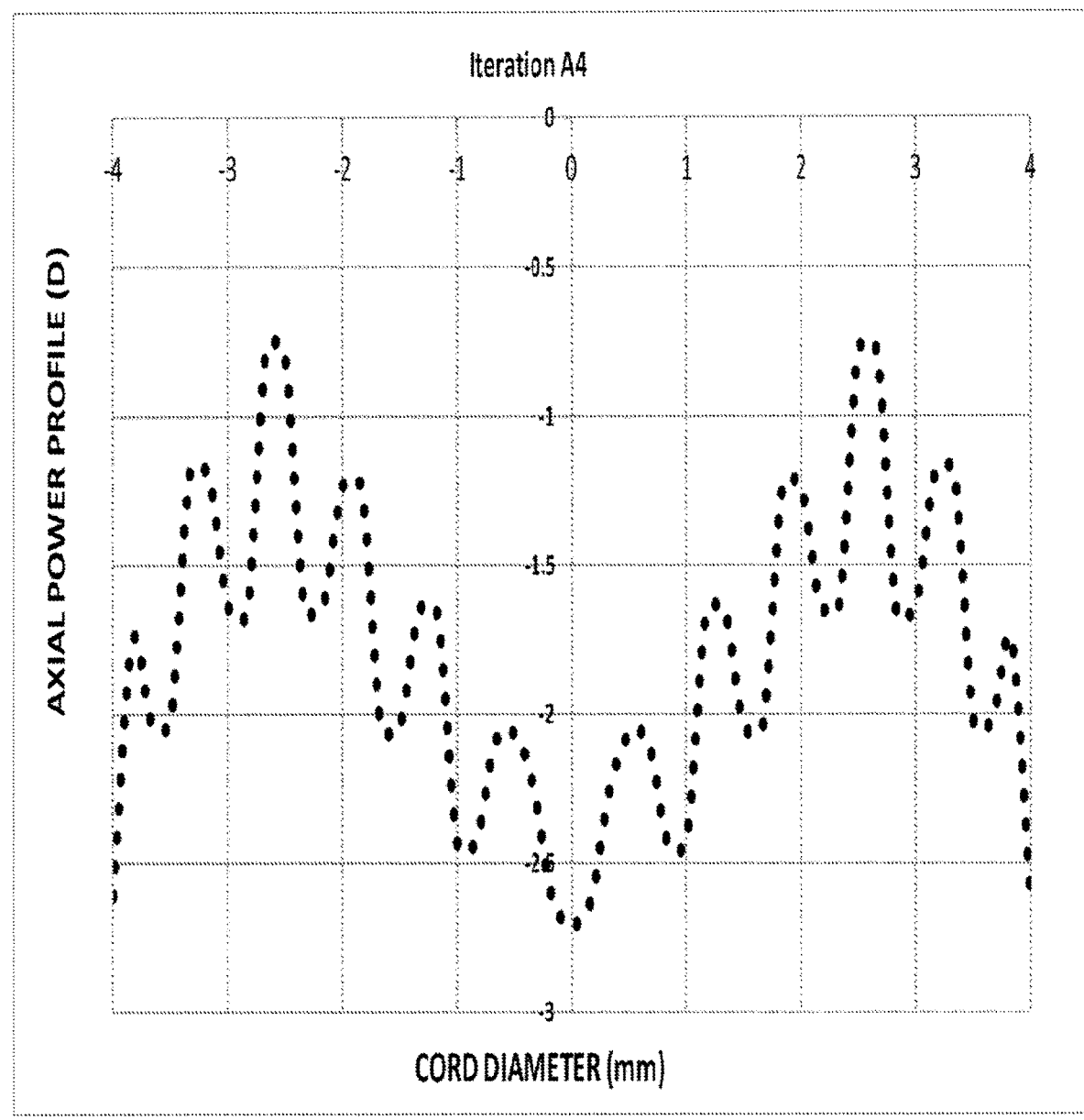
Figure 8P:
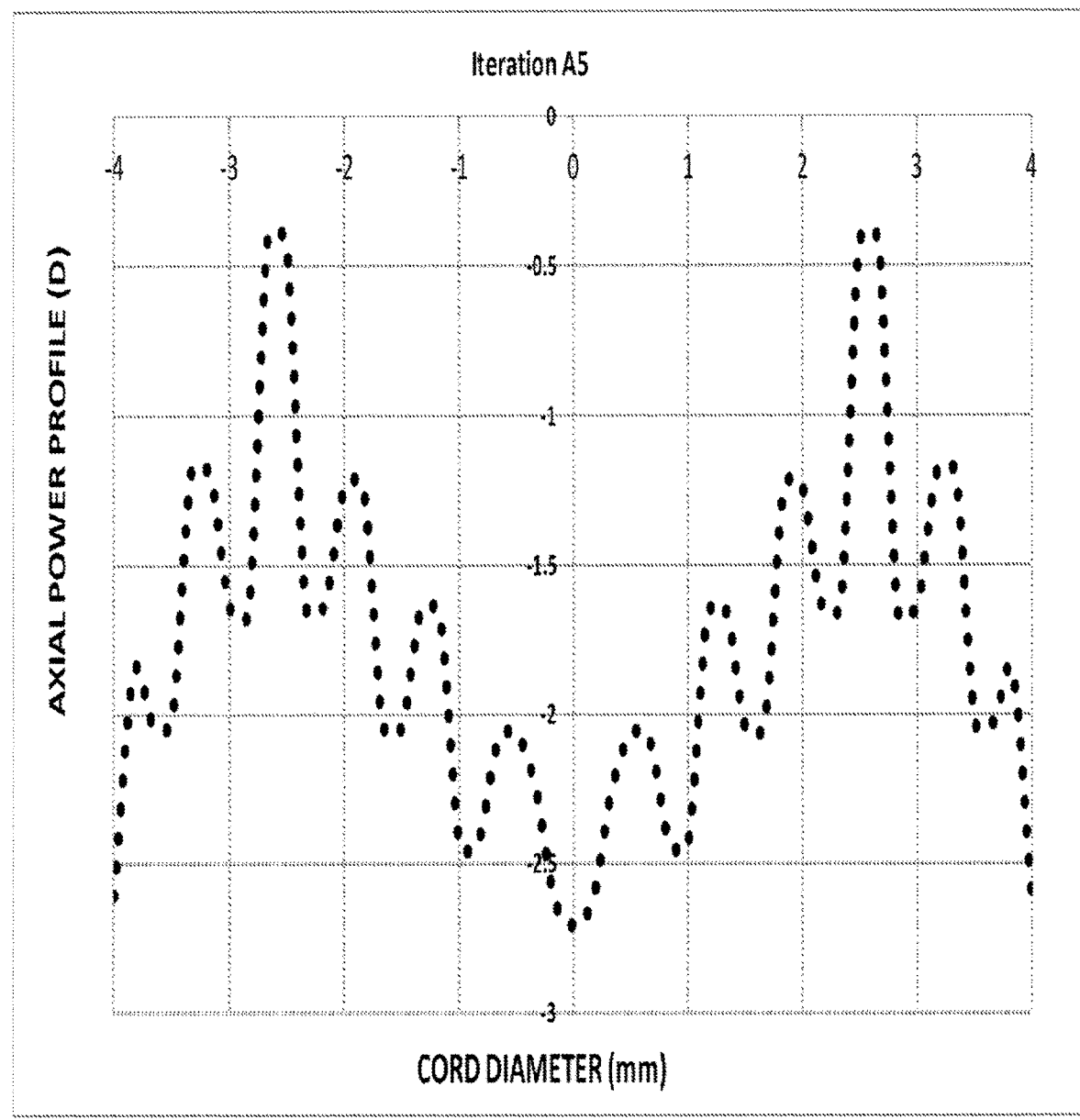
Figure 8Q:
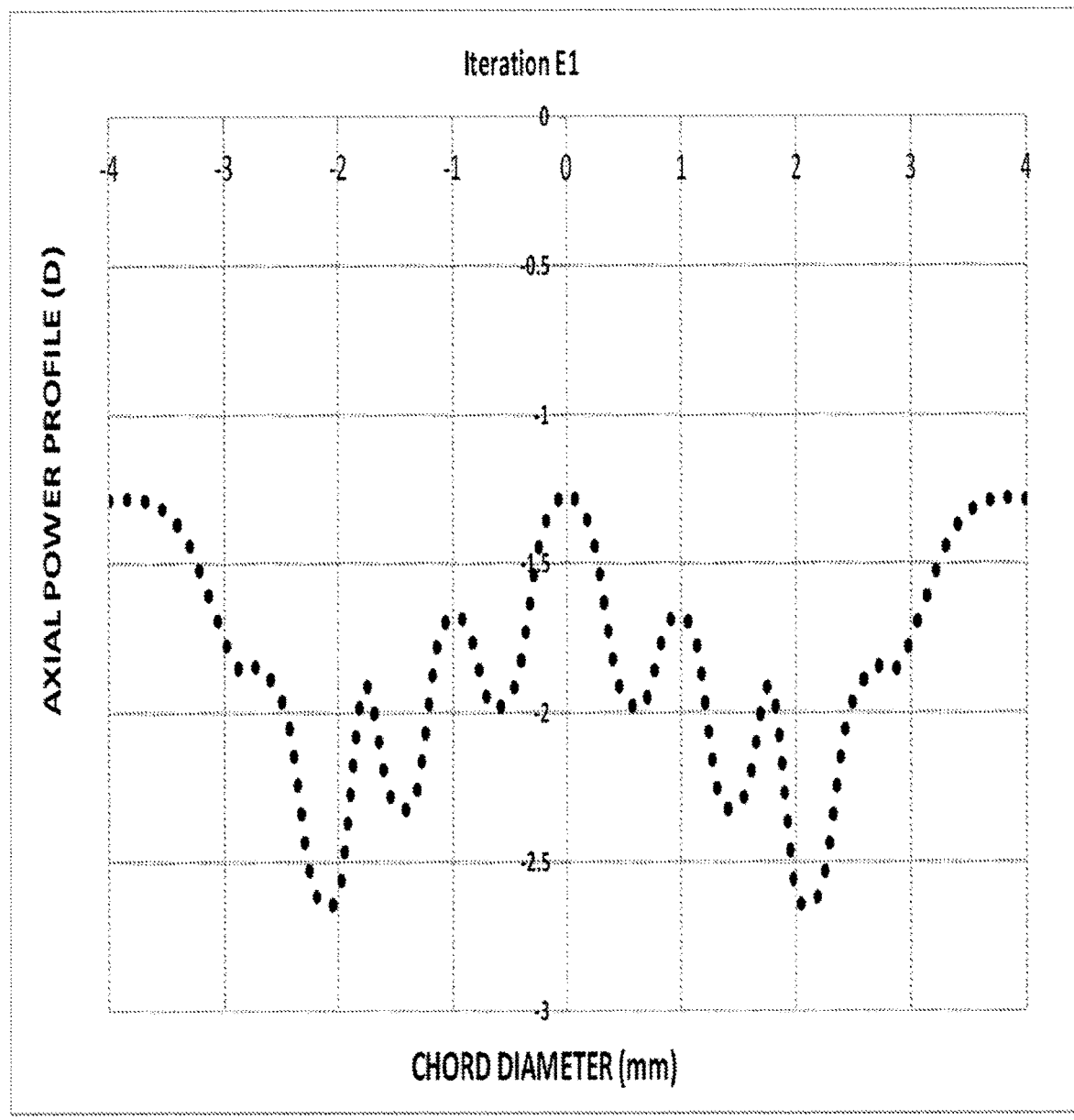
Figure 8R:
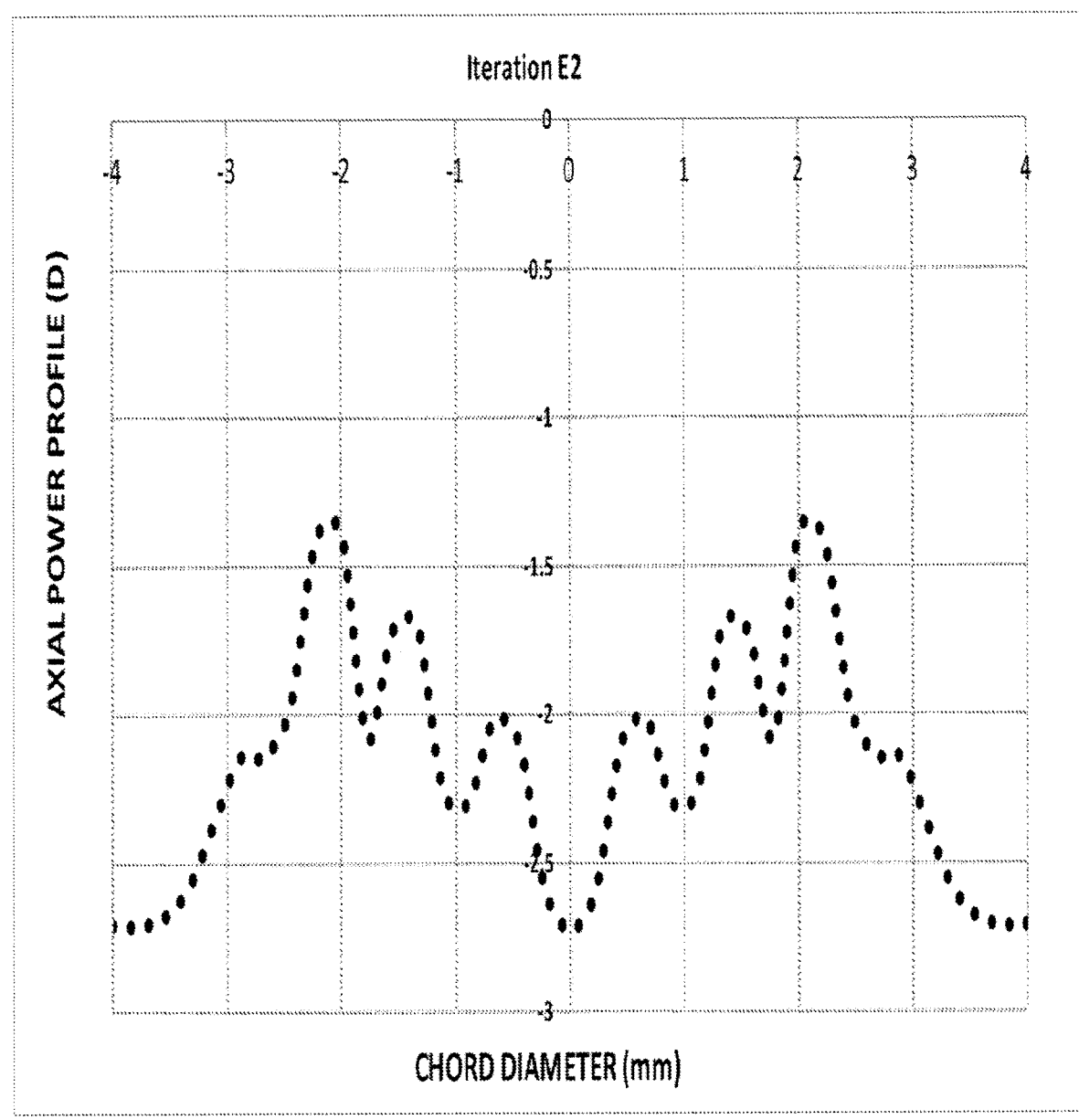
Figure 8S:
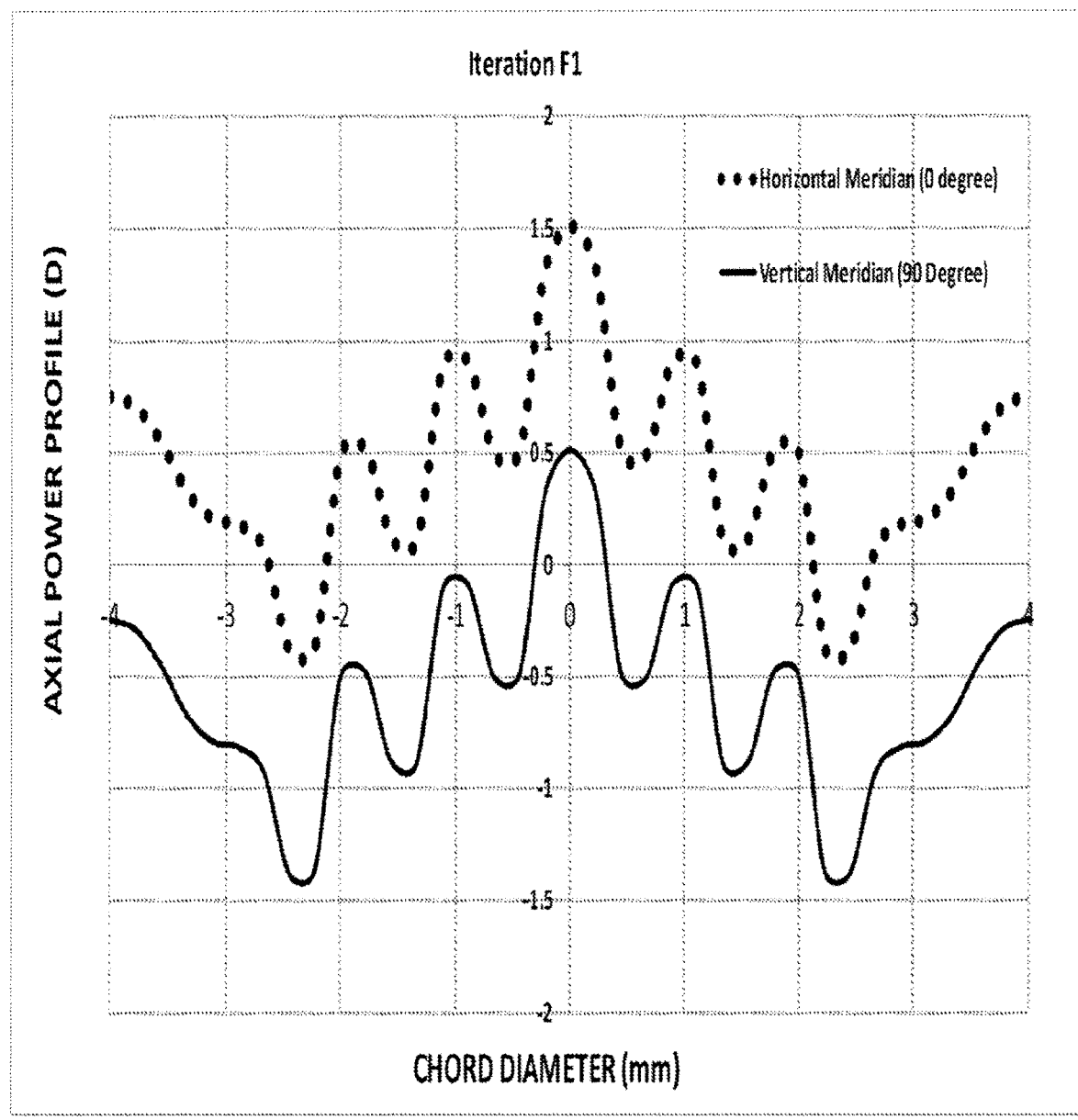
Figure 8T:
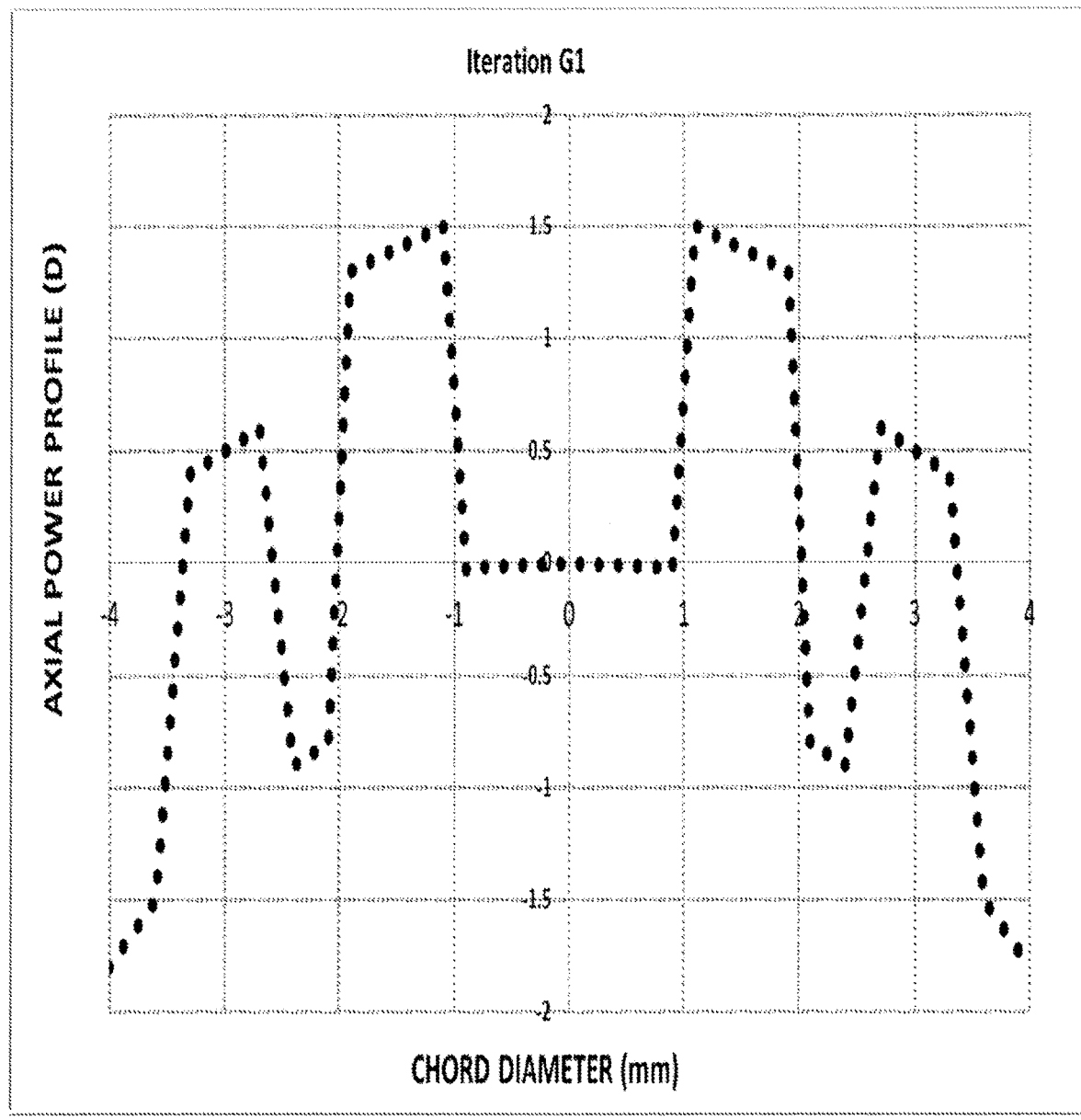
Figure 8U:
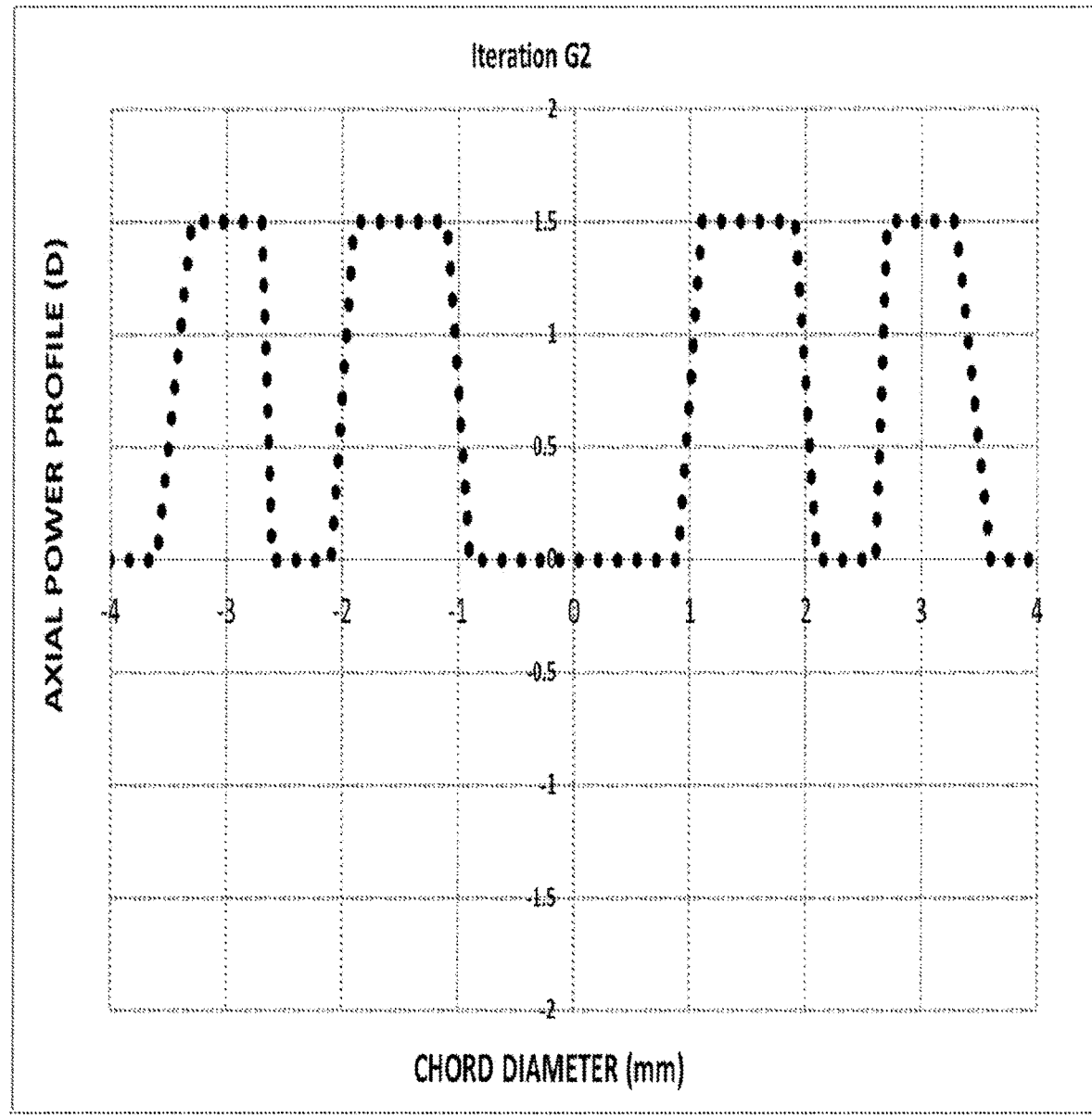
Figure 8V:
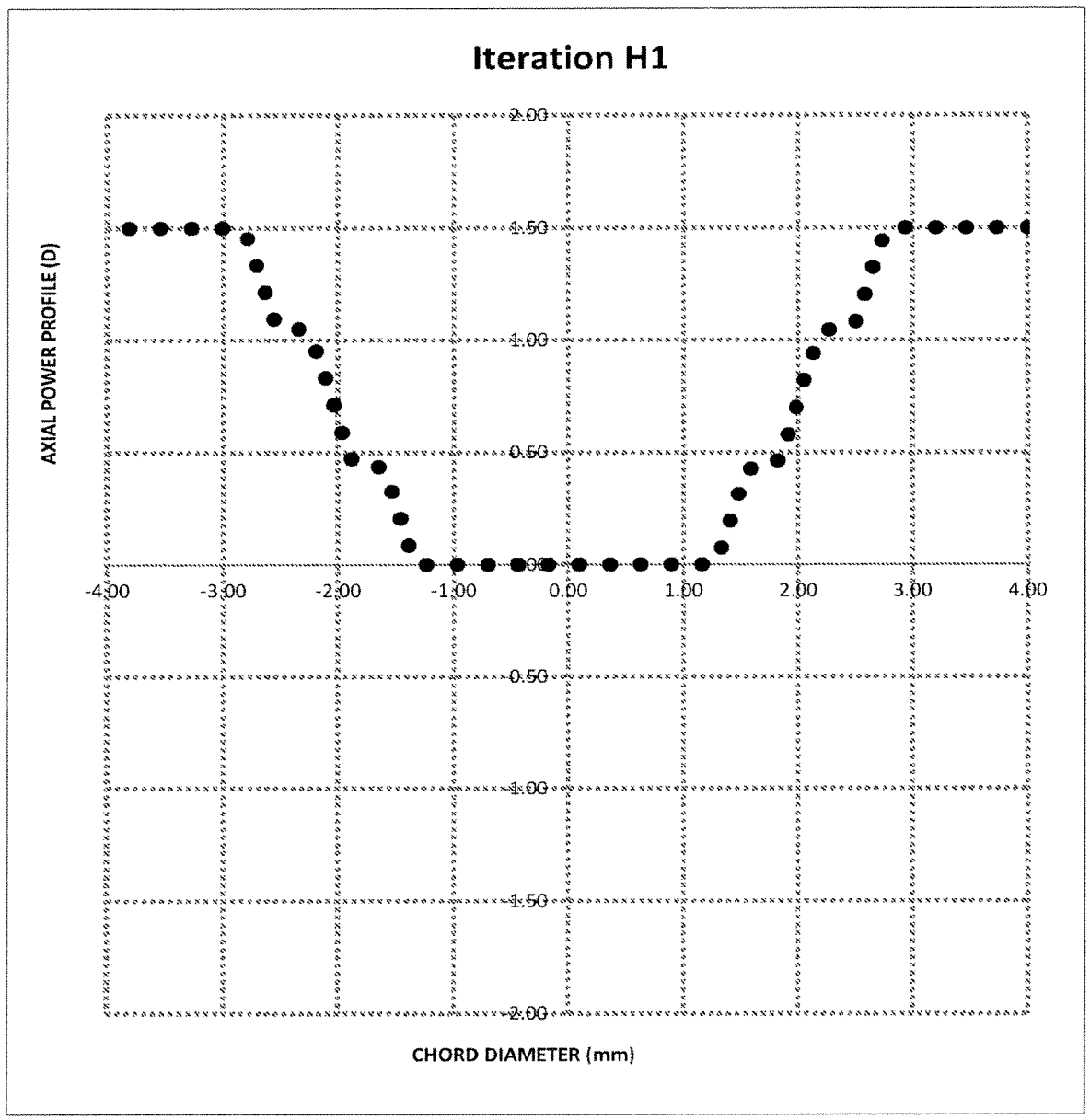
Figure 8W:
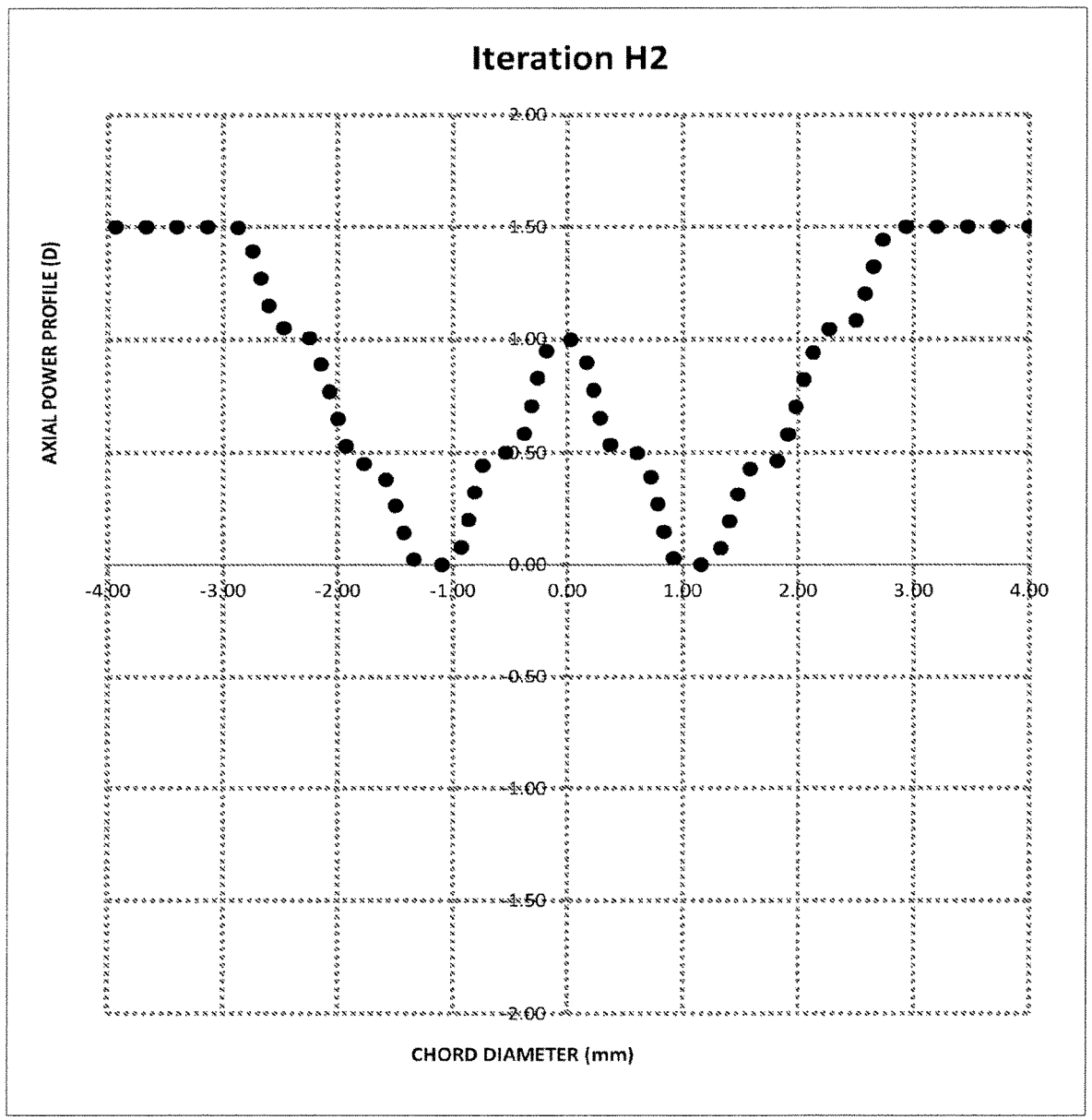

Although exemplary embodiments described herein generally describe power profiles with some form of rotational symmetry which allows the power distribution within the entire optic zone to be reduced to a one dimensional power plot, optic devices (contact lenses) may not be rotationally symmetric. The systems, methods, and devices described herein are still applicable. For example, the front or back surface of a contact lens may be toric in shape, making the base power variable between different meridians as illustrated in FIG. 8S. Other, more complex variations could also be imagined. The basic concept of the systems, methods, and devices can still be applied (e.g., one would analyze the different meridians of interest separately and then combine the overall result).

In exemplary embodiments, the system may be configured to provide the pass/fail result and/or the label power within 5, 6, 7, 8, 9, 10, 11, 12, 13, 14, 15, 16, 17, 18, 19, 20, 21, 22, 23, 24 or 25 seconds. In exemplary embodiments, the system may be configured to provide the pass/fail result and/or the label power within 50, 60, 70, 80, 90, 100, 110, 120, 130, 140, 150, 160, 170, 180, 190, 200, 210, 220, 230, 240, 250, 300, 350, 400, 450, or 500 msec.

While embodiments of the have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. A method comprising:
    measuring a power profile and/or the surface profile of manufactured optic device, mold, and/or cavity;
    identifying a region of interest from the measured power profile and/or measured surface profile of manufactured optic device, mold, and/or cavity;
    determining at least one offset to the measured power profile and/or measured surface profile to reduce a statistical quantifier for quantifying the similarity between a corresponding nominal power profile and/or surface profile of the manufactured optic device, mold, and/or cavity and the offset measured power profile and/or offset measured surface profile;
    comparing the offset and the statistical quantifier to predefined quality control metrics; and
    determining whether the measured power profile meets the predefined quality control metrics based, at least in part on the comparison.

2. The method of claim 1, further comprising determining whether to associate the manufactured optic device, mold, and/or cavity with another nominal power profile, power, and/or surface profile, if the measured power profile and/or measured surface profile does not meet the predefined quality control metrics.

3. The method of claim 1, further comprising applying a scaling factor to the offset measured power profile and/or offset measured surface profile to substantially minimize a statistical quantifier for quantifying the similarity between the nominal power profile and/or nominal surface profile and the scaled and offset measured power profile and/or scaled and offset measured surface profile and comparing the scale factor, offset and the statistical quantifier to predefined quality control metrics.

4. The method of claim 1, further comprising:
applying an asphericity correction to the scaled and offset measured power profile and/or scaled and offset measured surface profile to substantially minimize a statistical quantifier for quantifying the similarity between the nominal power profile and/or nominal surface profile and the corrected, scaled and offset measured power profile and/or corrected, scaled and offset measured surface profile; and
comparing the rotation, scale factor, offset and the statistical quantifier to predefined quality control metrics.

5. The method of claim 1, wherein the statistical quantifier is a sum of the squared differences calculated over the region of interest.

6. The method of claim 1, wherein the method is performed during the manufacturing process.

7. The method of claim 1, wherein the method is performed in substantially real-time.

8. The method of claim 1, wherein the optic device is manufactured on a high speed manufacturing line and the method is performed in substantially real-time.

9. The method of claim 1, wherein the method reduces the output of the manufacturing line by less than 1%, 2%, 3%, 4%, 5%, 10%, or 15%.

10. The method of claim 1, wherein power profile cannot be described with a single straight line or a single conic section and/or there is at least a ±0.25-0.30 diopter power variation from the mean power.

11. The method of claim 1, wherein the nominal power profile and/or nominal surface profile has multiple peaks and/or troughs along the half chord.

12. The method of claim 1, wherein the nominal power profile and/or nominal surface profile has at least 3, 4 or 5 peaks and/or troughs along the half chord.

13. The method of claim 1, wherein the nominal power profile and/or nominal surface profile comprises at least two spherical aberration terms.

14. The method of claim 1, wherein the nominal power profile and/or nominal surface profile comprises at least two spherical aberration terms and a defocus term.

15. The method of claim 1, wherein the nominal power profile and/or nominal surface profile comprises at least three spherical aberration terms.

16. The method of claim 1, wherein the nominal power profile and/or nominal surface profile comprises at least 4, 5, 6, 7 or 8 spherical aberration terms.

17. The method of claim 1, wherein the nominal power profile and/or nominal surface profile is non-monotonic.

* * * * *